US009501450B2

(12) United States Patent
Gould et al.

(10) Patent No.: US 9,501,450 B2
(45) Date of Patent: Nov. 22, 2016

(54) SYSTEM AND METHOD FOR BIO-OPTICAL ENVIRONMENTAL RECONNAISSANCE

(71) Applicants: Richard W. Gould, Peal River, LA (US); Jeffrey W. Book, Slidell, LA (US); Mark S. Hulbert, Slidell, LA (US); Andrew J. Quaid, New Orleans, LA (US); Richard H. Smith, Picayune, MS (US); Emery W. Hughes, Mandeville, LA (US); Berry L. McCormick, Carriere, MS (US); David N. McNeal, Baton Rouge, LA (US); J Carey Harrington, Slidell, LA (US)

(72) Inventors: Richard W. Gould, Peal River, LA (US); Jeffrey W. Book, Slidell, LA (US); Mark S. Hulbert, Slidell, LA (US); Andrew J. Quaid, New Orleans, LA (US); Richard H. Smith, Picayune, MS (US); Emery W. Hughes, Mandeville, LA (US); Berry L. McCormick, Carriere, MS (US); David N. McNeal, Baton Rouge, LA (US); J Carey Harrington, Slidell, LA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 779 days.

(21) Appl. No.: 13/750,642

(22) Filed: Jan. 25, 2013

(65) Prior Publication Data
US 2014/0214323 A1    Jul. 31, 2014

(51) Int. Cl.
| | | |
|---|---|---|
| B63B 49/00 | (2006.01) | |
| G06F 17/00 | (2006.01) | |
| B63B 21/29 | (2006.01) | |
| B63G 8/00 | (2006.01) | |
| G01L 19/00 | (2006.01) | |
| G01V 1/38 | (2006.01) | |

(52) U.S. Cl.
CPC ............. *G06F 17/00* (2013.01); *B63B 21/29* (2013.01); *B63G 8/001* (2013.01); *G01L 19/0092* (2013.01); *G01V 1/38* (2013.01); *Y10T 29/49002* (2015.01)

(58) Field of Classification Search
CPC ...................................................... G06F 17/00
USPC ............................................................ 702/2
See application file for complete search history.

(56) References Cited

U.S. PATENT DOCUMENTS

| | | | | |
|---|---|---|---|---|
| 3,628,205 A | * | 12/1971 | Starkey ................. | B63B 22/003 367/4 |
| 3,633,529 A | * | 1/1972 | Serrano .................... | B63C 11/42 114/330 |
| 4,631,956 A | * | 12/1986 | Walden .................... | B64D 1/02 441/25 |
| 5,920,524 A | * | 7/1999 | Stein ....................... | G01V 1/001 181/122 |
| 2003/0210184 A1 | * | 11/2003 | Apostolos ............. | G01S 5/0018 342/192 |
| 2005/0169713 A1 | | 8/2005 | Luc | |
| 2008/0089176 A1 | * | 4/2008 | Barnard .................. | B63B 22/04 367/89 |

(Continued)

OTHER PUBLICATIONS

Jean-Guy Dessureault, Donald J. Belliveau, and Scott W. Young; "Design and Tests of a Trawl-Resistant Package for an Acoustic Doppler Current Profiler;" Oct. 1991; IEEE Journal of Oceanic Engineering; vol. 16, No. 4, pp. 397-401.*

(Continued)

*Primary Examiner* — Mischita Henson
*Assistant Examiner* — Christine Liao
(74) *Attorney, Agent, or Firm* — US Naval Research Laboratory; Scott G. Bell

(57) ABSTRACT

System for collecting ocean data includes a trawl-resistant bottom mooring having a base unit and profiler on board. Method for collecting ocean data includes steps for receiving and executing a configuration file in the base unit and the profiler, collecting data, transmitting the data to a receiving station, and transferring to and archiving the data in the base unit.

14 Claims, 25 Drawing Sheets

(56) References Cited

U.S. PATENT DOCUMENTS

| | | | |
|---|---|---|---|
| 2010/0060286 A1* | 3/2010 | Summerfield | G01V 3/12 324/334 |
| 2011/0058814 A1* | 3/2011 | Camilli | H04B 10/272 398/104 |
| 2011/0226174 A1 | 9/2011 | Parks | |
| 2011/0291862 A1 | 12/2011 | Broman | |
| 2012/0212350 A1* | 8/2012 | Magnell | F03B 13/10 340/850 |
| 2012/0289103 A1 | 11/2012 | Hudson | |

OTHER PUBLICATIONS

K.W. Doherty, D.E. Frye, S.P. Liberatore, J.M. Toole; "A Moored Profiling Instrument;" Dec. 3, 1998; Jounal of Atmospheric and Oceanic Technology; vol. 16, pp. 1816-1829.*

Book, J.W, Martin, P., Rixen, M., Dykes, J., Wang, D., Ladner, S., Tudor, M. and Chiggiato, J., Real-Time Coastal Monitoring and Prediction for Operations and Research, 2007 NRL Review, pp. 187-190, 2007.

Book, J., Rixen, M., Carta, A., Hulbert, M., Quaid, A., Coelho, E., Grandi, V., Gualdesi, L., Shallow Water Environmental Profiler in Trawl-Resistant Real-Time Configuration (SEPTR) Used for Frontal Dynamics Research, Rapp. Comm. int. Mer Medit., 38, 2007.

Burrage, D.M., Book, J.W., and Martin, P.J., Eddies and Filaments of the Western Adriatic Current near Cape Gargano: Analysis and Prediction, Journal of Marine Systems, vol. 78, pp. S205-S226, Mar. 9, 2009.

Chiggiato, J., Jarosz, E., Book, J. W., Dykes, J., Torrisi, L., Poulain, P-M., Gerin, R., Horstmann, J., and BeŞiktepe, Ş., Dynamics of the Circulation in the Sea of Marmara: Numerical Modeling Experiments and Observations from the Turkish Straits System Experiment, Ocean Dynamics, vol. 62, pp. 139-159, 2012.

Grandi, V., Carta, A., Gualdesi, L., de Strobel, F. and Fioravanti, S., An Overview of SEPTR: Shallow Water Environmental Profiler in a Trawl-Safe Real-Time Configuration, Proceedings of the IEEE/OES Eighth Working Conference on Current Measurement Technology, pp. 142-146, 2005.

Walsh, D., Wange, D. and Book, J.W., NRL Publication,NRL/MR/7330-05-8876, Preliminary Scientific Assessment of the Jul. 2004 SEPTR Test Deployment, pp. 1-10, Jul. 11, 2005.

Rixen, M., et al, Improved Ocean Prediction Skill and Reduced Uncertainty in the Coastal Region from Multi-model Super-ensembles, Journal of Marine Systems, vol. 78, pp. S282-S289, Feb. 28, 2009.

Rixen, M., Book, J., Martin, P. Pinardi, N., Oddo, P., Chiggiato, J. Russo, N., Multi-Model Super-ensemble Ocean Prediction: An Operational Example Using a Kalman Filter in the Adriatic Sea, Rapp. Comm. Int. Mer Medit., 38, 2007.

Tyce, R., Critz, K., Book, J. W., and Tender, L., Low Power Control Systems for Microbial Fuel Cell Batteries, IEEE, 2008.

Tyce, R., de Strobel, F., Grandi, V., Gualdesi, L., Trawl-Safe Profiler Development at SACLANT Centre for Shallow Water Environmental Assessment and Real Time Modeling, IEEE, pp. 99-104, 2000.

Tyce, R., de Strobel, F., Grandi, V., Gualdesi, L., Shallow Water Expendable and Trawler Safe Environmental Profilers, Oceans '99 MTS/IEEE Riding the Crest Into the 21st Century, vol. 3, pp. 1229-1233, 1999.

Tyce, Robert, de Strobel, Federico, Grandi,Vittorio and Gualdesi, Lavinio, Shallow Water Expendable Environmental Profiler (SWEEP) design with control and data recovery via cellular phone and low earth orbit satellite networks. Proceedings of Oceanology International '98, Brighton, UK, pp. 199-207, Mar. 10-13, 1998.

* cited by examiner

SYSTEM AND METHOD FOR BIO-OPTICAL ENVIRONMENTAL RECONNAISSANCE

CROSS-REFERENCE TO RELATED APPLICATIONS

Not applicable.

BACKGROUND

Methods and systems disclosed herein relate generally to autonomous sensing of ocean properties, and more specifically to instruments to remotely sense bio-optical properties. A major focus of oceanographic research expected over the next several decades is on the space/time variability of bio-optical processes observed through in situ and remote sensing techniques, and modeling the bio-optical processes. Tools to measure a large suite of optical parameters, in real-time, over long periods, to facilitate algorithm development, relate bio-optical and physical phenomena, and incorporate phenomena into ocean models will be needed. A continuous, long-term record could be needed to resolve the small-to-fine scale spatial and temporal processes operating on the shelf transition zone and in the coastal zone, for example, but not limited to, wind events, sediment re-suspension and transport, tidal effects, long-shore currents, and loop current intrusions.

Currently, physical data and limited optical data, including temperature, salinity, current, wave measurements, backscattering at two wavelengths, and fluorescence at one wavelength can be obtained autonomously. However, current technology either lacks a complete set of optical instrumentation, or it is not trawl-resistant, or both. If the current technology is not trawl-resistant, unattended operation in coastal areas can be risky and could result in damage to the instrumentation.

Pontoon and buoy-based profiling systems that float at the surface and profile downward, as opposed profiling systems that rest on the bottom and profile upward, do not have the capability to accommodate the full suite of optical instrumentation. Furthermore, since floating profiling systems have a continuous surface expression, they are subject to severe wind and wave conditions and ship traffic collisions that could impact operation. Other optical moorings can have physical and optical sensors placed only at the surface or at a few fixed locations along a vertical cable. Thus, although they are able to collect long-term data records, the sensors only sample at a few fixed depths in the water column, and therefore cannot completely resolve the vertical structure.

Vertical profiles collected using standard physical/optical profiling packages lowered by winch from a ship platform have severe sampling limitations. For ship-based collection of data sets, survey work could be required at additional monetary, labor, and opportunity cost. Thus, ship sampling cannot easily replace autonomous sampling to capture a long-term, unattended sampling record.

Current autonomous technology houses scientific instruments that sit on the seafloor and combine an upward looking acoustic Doppler current profiler (ADCP) with an up/down casting float containing a single optical sensor, a conductivity/temperature/depth probe, a pressure sensor for wave data, a pressure sensor for the CTD, and a satellite transceiver. These housings are constructed of fiberglass. Other bio-optical mooring systems use a pump mechanism to circulate water during the measurement, have large power requirements and lack anti-fouling mechanisms, which result in shorter deployment periods.

What is needed is a system for profiling from a bottom mooring, facilitating oceanographic research to address scientific questions regarding the coupling of optical and physical ocean properties, the validity of algorithms that extrapolate surface satellite optical observations to depth, and the variability of optical properties over short time and space scales. What is further needed is a system that accommodates multiple optical sensors that do not require a pump mechanism, anti-fouling mechanisms and miniaturized instruments. Still further, what is needed is a system having relatively low power requirements, relatively long unattended deployment time, and a relatively high sampling frequency with respect to the current technology.

SUMMARY

The system of the present embodiment, a moored profiling system, provides data sets that can further the understanding of the linkages between physical, biological, and optical processes. The sensor suite can enable the study of the impact of physical forcing and biological response, and can further enable successful prediction of bio-optical properties in coastal and off-shore environments. The system of the present embodiment can be unattended over long periods of time which can reduce the costs of long-term ship board measurements. The system can include an irradiance sensor, a BAM sensor, and two optics pucks for optical sensors. Previous systems included only a single optics puck. In the system of the present embodiment, the sensors have been specially designed to fit into the trawl-resistant enclosure. In addition, the system of the present embodiment can include a pop-up antenna on the profiler. Previous systems did not include that useful feature. The system of the present embodiment can use Iridium technology to transfer data, whereas previous systems were limited to GLOBALSTAR® via satellite, or the Global System for Mobile Communications (GSM) standard via a cell network. The system of the present embodiment relies on a conventional operating system instead of specialized controller boards. Further, the system of the present embodiment controls the pay out of the cable connecting the base unit to the profiler. Previous systems did not have that important capability. The system of the present embodiment is a stationary platform with a profiler that has a full suite of optics sensors that take full water column profile measurements, the data from all these optics sensors are relayed in near-real time to a ship or land-based station, and all the optics sensors are docked in a compact protective trawl-resistant housing. Prior art glider platforms are mobile, not stationary. No prior art has included a full suite of optics sensors and satellite transmission technology that are compact enough to be docked in a trawl-resistant housing that includes a profiler that is buoyant enough to collect ocean data throughout the water column.

The system of the present embodiment is a fully operational autonomous scientific instrument that sits on the seafloor and combines an upward looking ACDP with an up/down casting float including, but not limited to, a conductivity, temperature, depth (CDT) probe, a pressure sensor for wave data, an optics sensor suite, and a satellite transceiver. When deployed in littoral environments, the system of the present embodiment can monitor scientifically and operationally depth and time-dependent properties of the water column. Because many coastal environments are intensely fished, the system of the present embodiment is trawl-resistant. The trawl-resistant capability includes properties such as, but not limited to, low center of gravity, weight, between about 600 kg for stability and about 900 kg for ease of deployment, smooth surface, i.e. no instruments extend outward from the base unit, and low profile cross-section, i.e. the bottom seafloor to the top of the base unit should not exceed one meter including recessed attachment points to reduce the chance of snagging by a trawler, and about a 2-meter diameter footprint, meeting the criteria as above. Typically operated, the system of the present embodiment repeats a measurement cycle for a certain number of days, depending on the battery, before battery depletion. The measurement cycle can include, but is not limited to including ADCP velocity profiles every few minutes (adjustable) and profiles of the float with concurrent conductivity-temperature-depth (CTD) and optical profiles every few hours (adjustable), also including data telemetry, wave spectrum and significant wave height measurements every cast when the float surfaces. Sampling rates can be changed to meet various scientific requirements. The system of the present embodiment can also collect, but is not limited to collecting, a backscattering coefficient at three wavelengths, colored dissolved organic matter (CDOM), chlorophyll, and phycoerythrin fluorescence, beam attenuation coefficient, and downwelling irradiance at seven wavelengths.

The system of the present embodiment is a trawl-resistant bottom mooring including, but not limited to, a base unit, a profiler including bio-optical sensors, an antenna with pop-up capability, and communications software transmitting ocean measurement data collected by the sensors to a receiving station through the antenna, a cable attaching the profiler to the base unit, a controller and winch controlling ascent of the profiler from the base unit to water surface, and controlling timing and sampling frequency of the ocean measurements, an enclosure system surrounding the bio-optical sensors on the profiler protecting the bio-optical sensors and minimizing bio-fouling of the bio-optical sensors, a base unit battery set mounted in the base unit powering a bottom controller computer, the winch, and an ADCP, and inductively charging the profiler batteries, and a profiler battery set mounted in the profiler powering the antenna, a CTD, a pressure sensor, and the bio-optical sensors. The profiler floats by, for example, but not limited to, syntactic foam. The antenna system pop-up capability can provide water surface clearance to reduce data transfer failures.

The ocean measurement data sensors can include, but are not limited to including, an ADCP to measure current speed and direction. The profiler can include, but is not limited to including, a fast response SeaBird 49 CTD, a fluorescence triplet sensor to measure chlorophyll, phycoerythrin, and colored dissolved organic matter fluorescence, a three-wavelength backscattering sensor, a single-wavelength scattering meter, a seven-wavelength downwelling irradiance sensor, a pressure sensor measuring wave spectra, and a data interface package for internal package control and communication with the base unit and receiving station through an iridium system. The iridium-based satellite communication system can perform satellite-to-satellite communication, enabling complete global coverage.

The scattering meter, the multi-spectral backscattering sensor, the fluorescence triplet, and the multi-channel irradiance sensor can be used to resolve light attenuation, particle size distribution, dissolved versus phytoplankton fluorescence, and inorganic versus organic material. These are the fundamental properties related to biological and physical ocean phenomena. The sensor combination can be used to estimate other ocean data such as, for example, but not limited to, the total absorption and scattering coefficients. The rapid response CTD can be embedded in the package to assure physical properties of the water-column are measured concurrently with biological and optical properties. The bio-optical sensors of the present embodiment, which measure beam attenuation, irradiance, and backscattering, do not need a pump mechanism, and have anti-fouling mechanisms through their protected location at the base of the profiling unit, which is bathed in an anti-algal copper solution when in the stowed position between vertical casts. The combination of these packages allows for collection of synoptic measurements of both the optical and the physical oceanographic fields. The co-location of all these measurements on one system, for example, provides for detection and sampling of frontal edges and the passage of thin layers. Further, the collected data can be used for calibration/validation of remote sensing sensors and algorithms, and for assimilation into numerical simulations. The capability to collect a long time series of physical and optical data at fine temporal resolution over several weeks allows resolution of a wide variety of coastal and shelf oceanographic processes, such as tidal exchange, internal waves and solitons, longshore/cross-shelf currents, sediment resuspension/transport events, development and decay of algal blooms, and river plume extent, among others. The system of the present embodiment can be used to assess the ability of models to forecast changes in the vertical distributions of biological and optical oceanic conditions. By providing a long-term, continuous record of coastal optical conditions, coupled physical/bio-optical models can be initialized and validated. In addition, the optical data sets can complement the ADCP data collected in efforts to determine riverine discharge and particle composition changes in response to flow field conditions. Both of these are important for monitoring potential contamination of harbors and contaminant dispersal into surrounding areas.

The bottom mooring of the present embodiment for enabling ocean measurement data can include, but is not limited to including, a base unit having trawl-resistant dimensions and a trawl-resistant structure, a profiler including a plurality of optical sensors, an antenna and communications equipment transmitting the ocean measurement data collected by the sensors to a receiving station through the antenna, a cable attaching the profiler to the base unit, a controller and winch controlling ascent of the profiler from the base unit to a water surface, the controller controlling timing and sampling frequency of the ocean measurement data, an enclosure system surrounding the optical sensors on the profiler protecting the bio-optical sensors from bio-fouling, at least one profiler battery mounted in the profiler and powering the antenna, the CTD sensor, and the optical sensors, an acoustic Doppler current profiler (ADCP) in electronic communications with the base unit, and a base unit battery set mounted in the base unit powering an on-board computer and the winch, the base unit battery set inductively charging the at least one profiler battery.

The trawl-resistant dimensions are about a 2-meter footprint and a 1-meter height. The trawl-resistant structure includes properties such as circularity, smoothness, no edges, and drainage holes. The profiler can optionally include a conductivity-temperature-depth (CTD) sensor, a fluorescence triplet sensor measuring chlorophyll, phycoerythrin, and colored dissolved organic matter fluorescence, a backscattering sensor, a scattering meter, a downwelling irradiance sensor, and a pressure sensor measuring wave spectra. The profiler can also optionally include a pop-up antenna. The communications equipment can optionally be an iridium system. The profiler can optionally include an aluminum enclosure. The base unit can optionally include a fiberglass enclosure. The battery unit base set can optionally power the ADCP, or the ADCP can be self-powered.

A method of the present embodiment for collecting ocean sensor data can include, but is not limited to including, the steps of receiving, at a base unit, a wake-up and a time from an on-board computer, accessing, by the base unit, a pre-loaded schedule. If, according to the pre-loaded schedule, a task is not to be executed by the base unit, the method can include the steps of calculating a next wake-up time based on the schedule, directing the on-board computer to send a next wake-up at the next wake-up time, and powering down the base unit and a profiler. If, according to the pre-loaded schedule, a task is to be executed by the base unit, the method can include the steps of checking a status of the on-board computer, and performing biofouling remediation. If, according to the pre-loaded schedule, it is not time to do a profile, the method can include the step of powering down the base unit and the profiler. If, according to the pre-loaded schedule, it is time to do a profile, the method can include the steps of creating a base unit schedule and a profiler schedule based on a dynamic configuration file, sending a profiler wake-up and the profiler schedule to the profiler, collecting ADCP data, transferring the ADCP data to the profiler, assessing a base unit status, sending the base unit status to the profiler, starting the base unit schedule and the profiler schedule, starting a winch towards the surface, stopping the winch when the profiler takes a pressure measurement, restarting the winch towards the surface when the pressure measurement has completed, restarting the winch towards the base unit when the profiler reaches the surface and completes transmitting the ADCP data, the base unit status, ocean sensor data collected from a previous descent, and the pressure measurement, stopping the winch when the profiler reaches the base unit, receiving the dynamic configuration file and the sensor data from the profiler, archiving the ocean sensor data, setting the next wake-up time, communicating the next wake-up time to the on-board computer, charging the base unit and the profiler, and powering down the base unit and the profiler.

An alternate method for collecting ocean sensor data can include, but is not limited to including, the steps of receiving at a profiler, from a base unit, a wake-up and a synch time, synchronizing, in the profiler, a profile time to the synch time, receiving at the profiler, from the base unit, ADCP data, base unit status, and a timing schedule, collecting, by the profiler, pressure data when a waves measurement time starts, processing waves, by the profiler, from the pressure data when the waves measurement time ends, transmitting, by the profiler, the pressure data, the ADCP data, sensor data, and the base unit status when the profiler reaches the ocean surface, receiving, by the profiler, a configuration file, collecting, by the profiler, the sensor data when said step of transmitting has completed, and sending the sensor data and the configuration file to the base unit and to an archive when the profiler reaches the base unit.

A method for using an ocean data collector can include, but is not limited to, the steps of loading a trawl-resistant enclosure with an ADCP, an on-board computer, a base unit, a battery, and a profiler having multiple optics sensors and a physical connection to the base unit, preloading the on-board computer with a configuration file and a schedule, lowering the base unit to the ocean floor, charging the base unit and the profiler with the battery, updating the configuration file when updates to the configuration file are received by the profiler, controlling the ascent and descent of the profiler based on control of the pay out of the physical connection by the base unit and the profiler schedule. The on-board computer can access the schedule to wake up the base unit, the base unit can access the configuration file to create a base unit schedule and a profiler schedule, and the profiler collects the ocean data according to the profiler schedule.

A method for manufacturing an ocean data collector can include, but is not limited to including, the steps of: contouring an enclosure to resist trawling vessels, manufacturing a profiler, a battery, a base unit, an ADCP, ocean data sensors, communications equipment, and an on-board computer according to size and shape constraints imposed by the contoured enclosure and the available space in the contoured enclosure, installing the ocean data sensors and the communications equipment in the profiler, tethering the profiler to the base unit, and installing the profiler, the battery, the base unit, the ADCP, and the on-board computer in the enclosure, the profiler and the base unit being proximate to the battery. The ocean data sensors can optionally include an irradiance sensor, a beam attenuation meter, a plurality of optics pucks. The communications equipment can optionally include iridium technology.

DETAILED DESCRIPTION

These solutions and other advantages are achieved by the various embodiments of the teachings described herein below.

Figure 1:
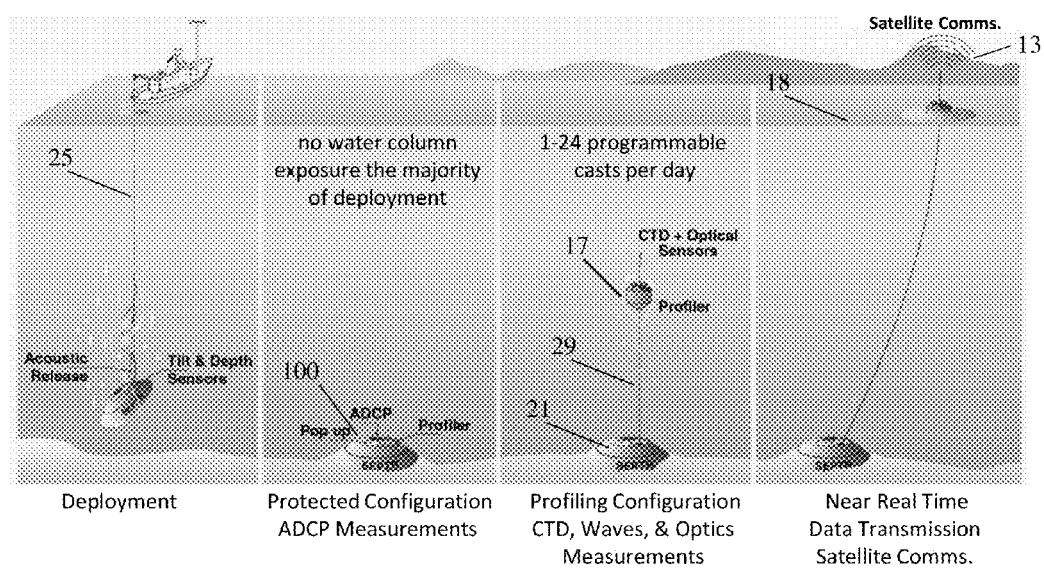
FIG. 1 is a schematic showing the deployment and operation of the system of the present embodiment.

Referring now to FIG. 1, system 100, a real-time data acquisition package that measures bio-optical and physical properties of a water column autonomously using optical and physical instrumentation, can include, but is not limited to including, physical/optical profiling subunits that are self-contained with data flow and communication capabilities including, but not limited to, two-way communication, controlling software, data collection, and storage. System 100 is a programmable, bottom-up profiling system that can be deployed in the ocean for up to eight weeks. System 100 is enclosed within trawl-resistant base unit 21 and can transmit to and receive from transceiving station 13 for real-time down link of a user-specified subset of the data and an on-board data archive system.

System 100 can include bio-optical sensors optimally arranged to minimize damage from the storage design of the profiling unit while keeping the integrity of the bio-optical measurements which are susceptible to bio-fouling, scratches from sand and bottom organisms, and solar contamination of the measurement. The buoyant system is outfitted with enclosure systems to protect the bio-optical subsystem from biofouling, and can be constructed of, for example, but not limited to, aluminum, titanium, fiberglass, or any material that is light, strong, and rugged. Communication software instructs system 100 to ascend and sample ocean data. Winch 11 (FIG. 3) and a controller (not shown) are capable of the speeds required for optical profiling (for example, but not limited to, about 10 cm/sec, i.e. at least that slow), enabling sampling of optical "thin layers" that are easily disturbed or undersampled with more rapid profiling speeds typical of physical sampling.

System 100 can include sensors of various sampling frequencies to measure both fine scale and large scale processes. For example, system 100 can include profiler 17 that can include a fast response SeaBird 49 CTD, a fluorescence triplet sensor to measure chlorophyll, phycoerythrin, and colored dissolved organic matter fluorescence, a three-wavelength backscattering sensor, a single-wavelength scattering meter, a seven-wavelength downwelling irradiance sensor, and a data interface package for internal package control and communication with base unit 21 and a land station (not shown) via Iridium satellite link, for example. Current systems are limited to a backscattering and fluorescence sensor triplet; as a single sensor, only "magnitude" of a scattering layer can be differentiated.

Figure 3:
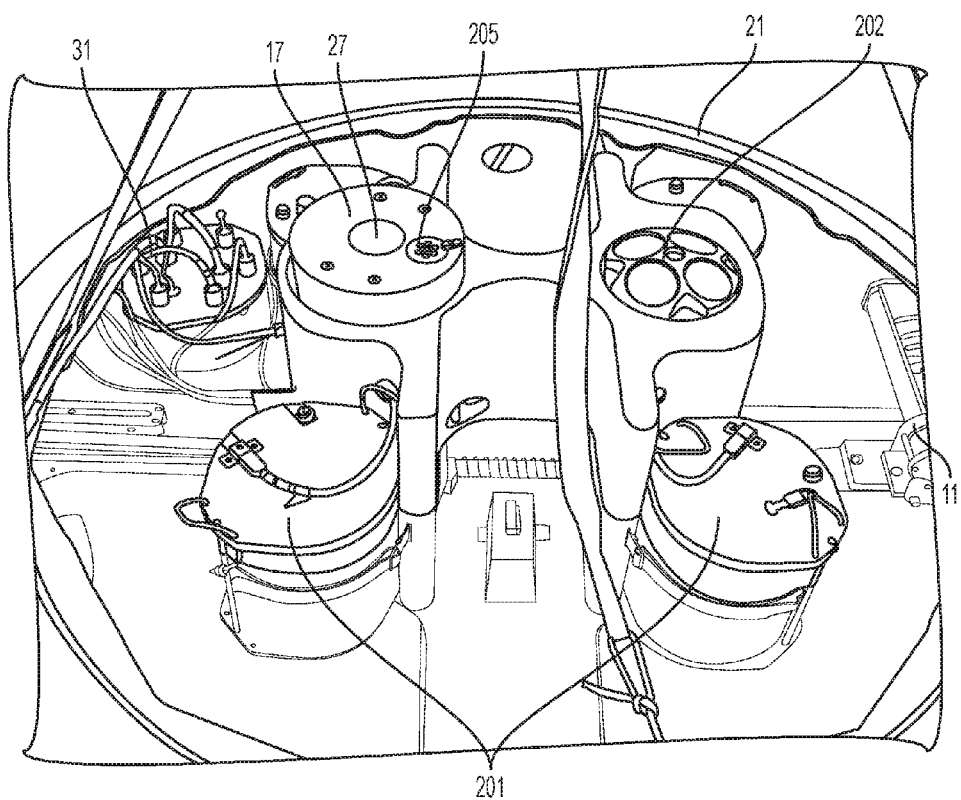
FIG. 3 is a photograph of the internals of the system of the present embodiment.

In summary, and referring primarily to FIG. 1, system 100 (FIG. 1), a trawl-resistant bottom mooring, can include, but is not limited to including, base unit 21 (FIG. 1), profiler 17 (FIG. 1) including bio-optical sensors, antenna 27 (FIG. 3) with pop-up capability, and communications software transmitting ocean measurement data collected by the sensors to receiving station 13 through antenna 27 (FIG. 3). System 100 (FIG. 1) can also include a cable 29 attaching profiler 17 to base unit 21, a controller and winch 11 (FIG. 3) controlling ascent of profiler 17 (FIG. 1) from base unit 21 (FIG. 1) to water surface 18 (FIG. 1), and controlling timing and sampling frequency of ocean measurements. System 100 can still further include an enclosure system 55 (FIGS. 5D and 11) surrounding the bio-optical sensors on profiler 17 (FIG. 1) protecting the bio-optical sensors and minimizing bio-fouling of the bio-optical sensors, at least one profiler battery 204 (FIG. 10) mounted in the profiler powering antenna 17 (FIG. 1), a CTD 200 (FIGS. 7, 8, 9, 10, and 11), a pressure sensor for waves, and the bio-optical sensors, for example, irradiance sensor 205 (FIG. 3), optical back scattering sensors 32 (FIG. 5D), and beam attenuation meter (BAM) 33 (FIG. 5D), and a base unit battery set 201 (FIG. 3) mounted in base unit 21 (FIG. 1) powering a bottom controller computer, a winch, and an ADCP 202 (FIG. 3), and inductively charging the at least one profiler battery 204 (FIG. 10). Ocean measurement data can include, but is not limited to including, current speed and direction. An exemplary profiler can include, for example, but is not limited to including, a fast response SeaBird 49 CTD, a fluorescence triplet sensor to measure chlorophyll, phycoerythrin, and colored dissolved organic matter fluorescence, a three-wavelength backscattering sensor, a single-wavelength scattering meter, a seven-wavelength downwelling irradiance sensor, a pressure sensor measuring wave spectra, and a data interface package for internal package control and communication with the base unit and receiving station through an iridium satellite system.

Figure 2:
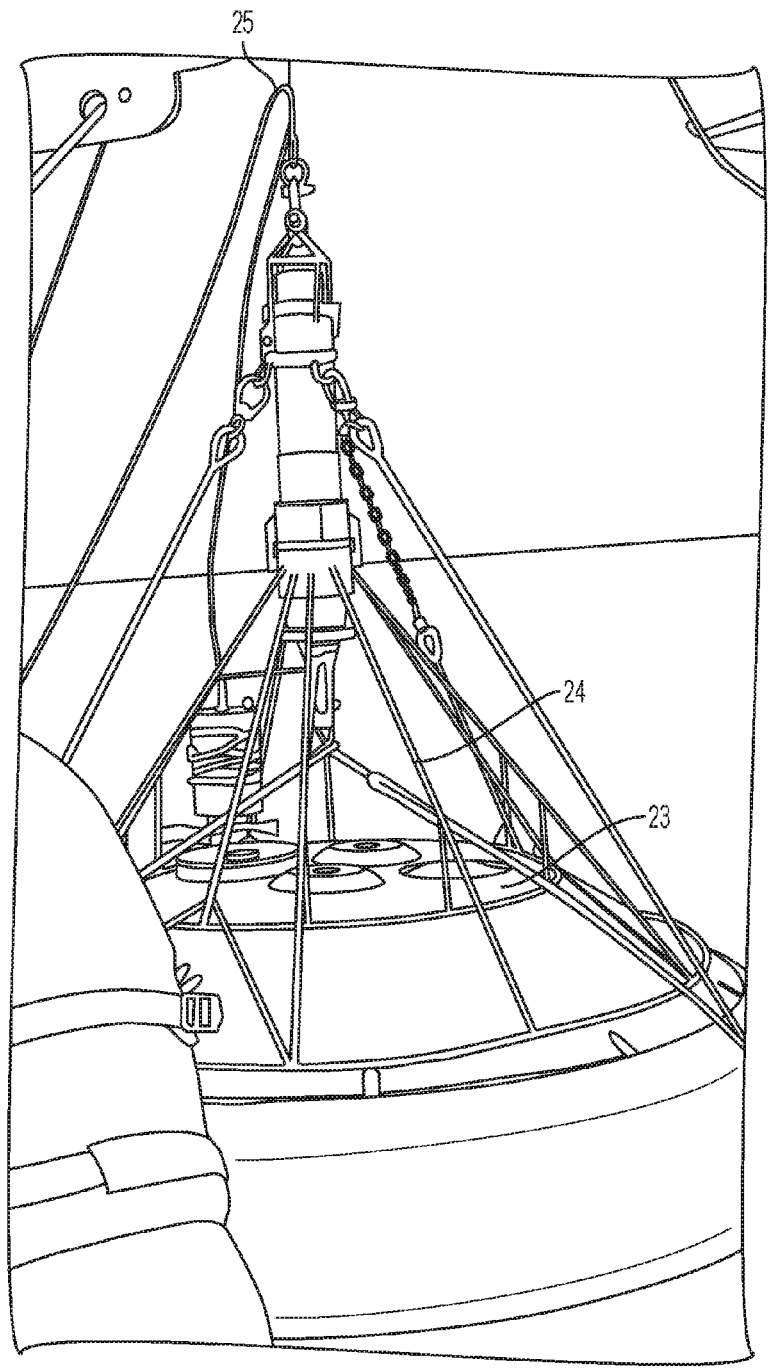
FIG. 2 is a photograph of the system of the present embodiment as it awaits deployment, a deployment cage with a cover on the base unit.

Referring now to FIG. 2, system 100 is shown before deployment with top cover 23, deployment cage 24, and cable 25 in place.

Referring now primarily to FIG. 3, profiler 17, containing CTD 200 (FIGS. 7 and 8) and optical instruments, with pop-up antenna 27 are positioned within base unit 21 (cover removed) in the configuration of the present embodiment. Profiler 17 ascends to the surface tethered to base unit 21 by profiler cable 29. Pop-up antenna 27, in extended position (see FIG. 4), elevates when profiler 17 reaches the surface in order to transmit data from profiler 17 to, for example, but not limited to, a land-based station and/or a ship. Following the ascent and data transmission, base unit 21 winches profiler 17 into base unit 21 where profiler 17 is stowed until the next ascent. On-board computer 31 is connected to base unit batteries 201 (and storage devices associated with on-board computer 31). Shown also are ADCP 202 and profiler winch 11.

Figure 4:
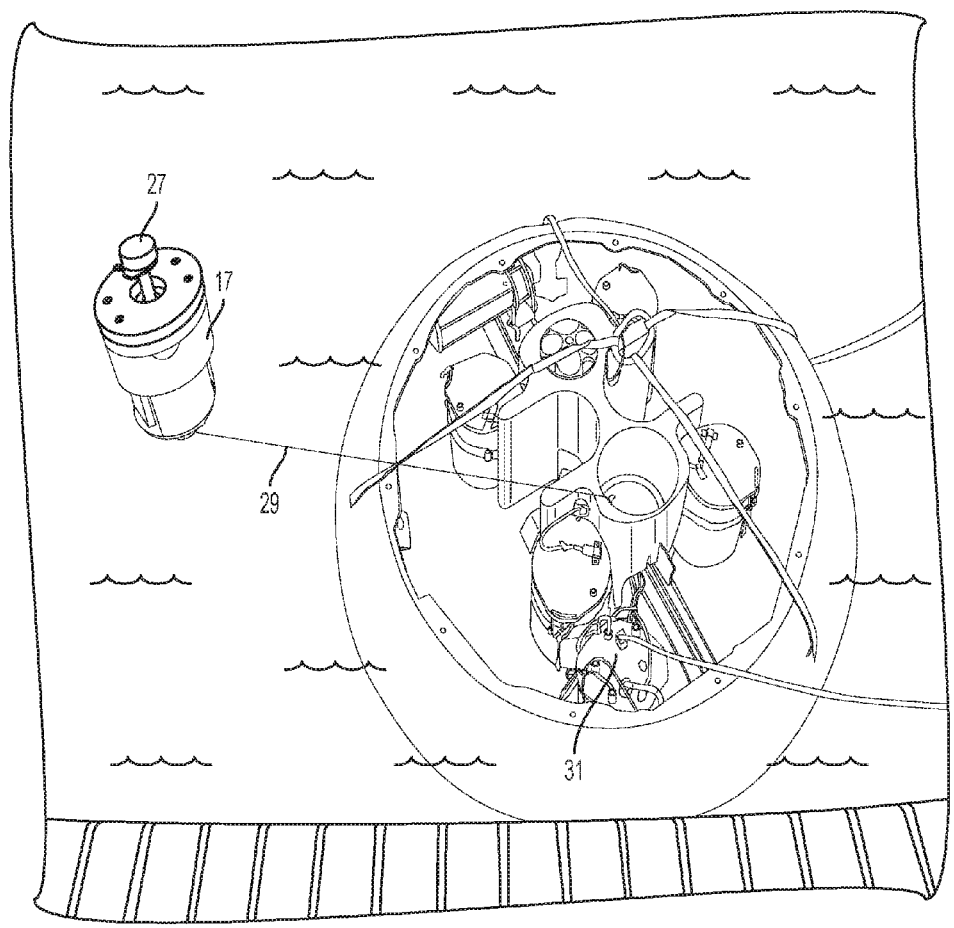
FIG. 4 is a photograph of the internals of the system of the present embodiment during a test deployment.

Referring now to FIG. 4, base unit 21 is shown deploying profiler 17 under test conditions in which pop-up antenna 27 in extended position is deployed by means of cable 29 and under control of on-board computer 31. On-board computer 31 uses commercially-available processors with, for example, but not limited to, UNIX-based CPU control.

Figure 5A:
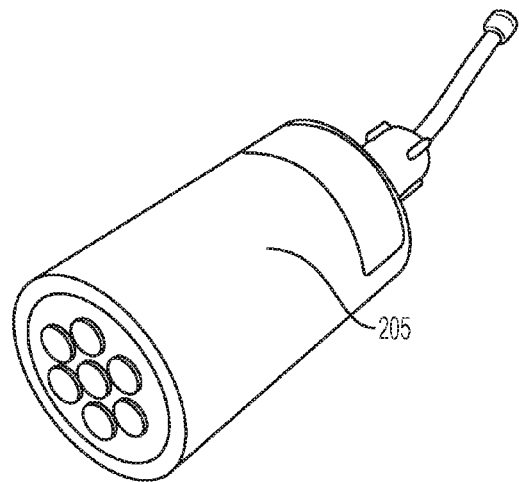
FIGS. 5A-5D are photographs of exemplary instruments that can be incorporated into the profiler of the present embodiment.
Figure 5B:
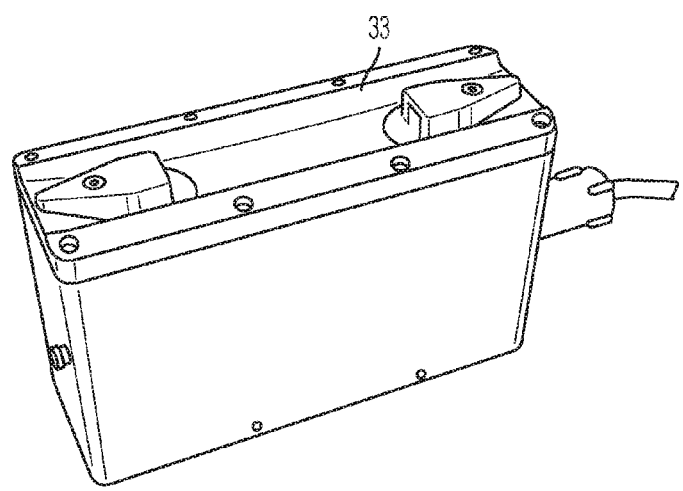
Figure 5C:
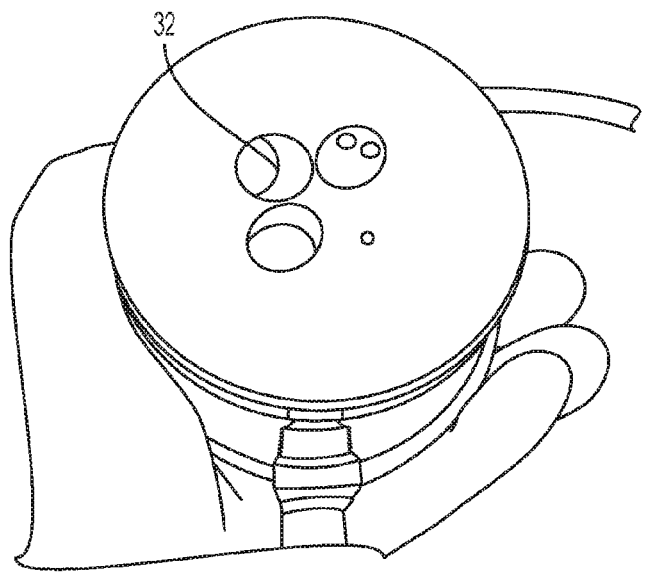
Figure 5D:
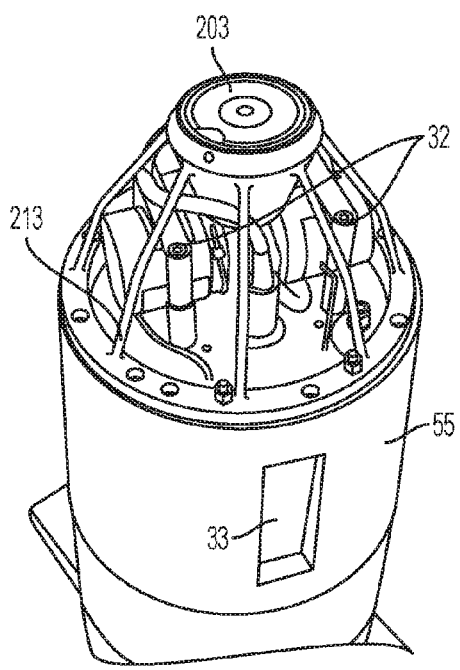

Referring now to FIGS. 5A, 5B, 5C, and 5D, some exemplary optical instruments that are contained within profiler 17 are shown. FIG. 5A is a photograph of irradiance sensor 205, for example, but not limited to, Satlantic, Inc. seven-wavelength downwelling irradiance sensor. FIG. 5B is a photograph of a WET LABS® BAM 33. FIG. 5C is a photograph of a WET LABS® optical puck 32 (either, for example, but not limited to, three wavelength backscattering sensor or 3-channel fluorescence sensing chlorophyll, colored dissolved organic matter (CDOM), and phycoerythrin). FIG. 5D is a photograph of inverted profiler 17 illustrating the arrangement of optical sensors, profiler inductive charger 203, optical pucks 32, profiler bottom cage 213, and enclosure system 55.

Figure 6A:
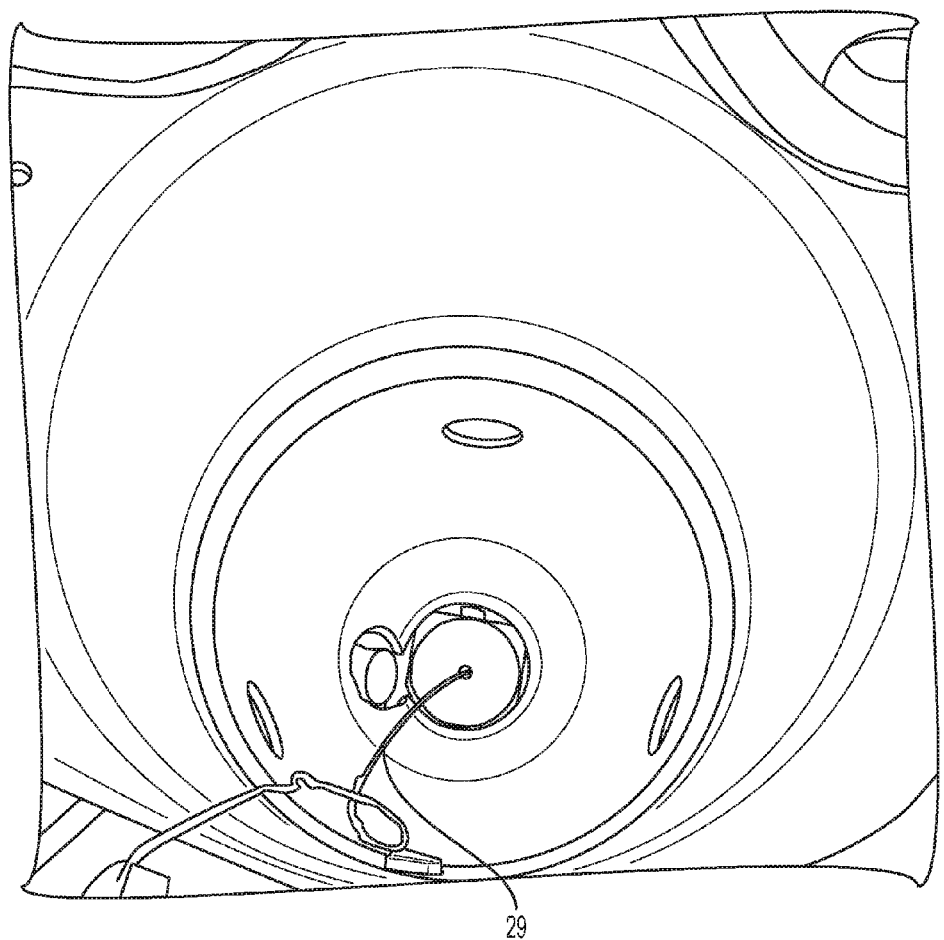
FIGS. 6A-B are photographs of the base unit profiler receiver of the present embodiment.
Figure 6B:
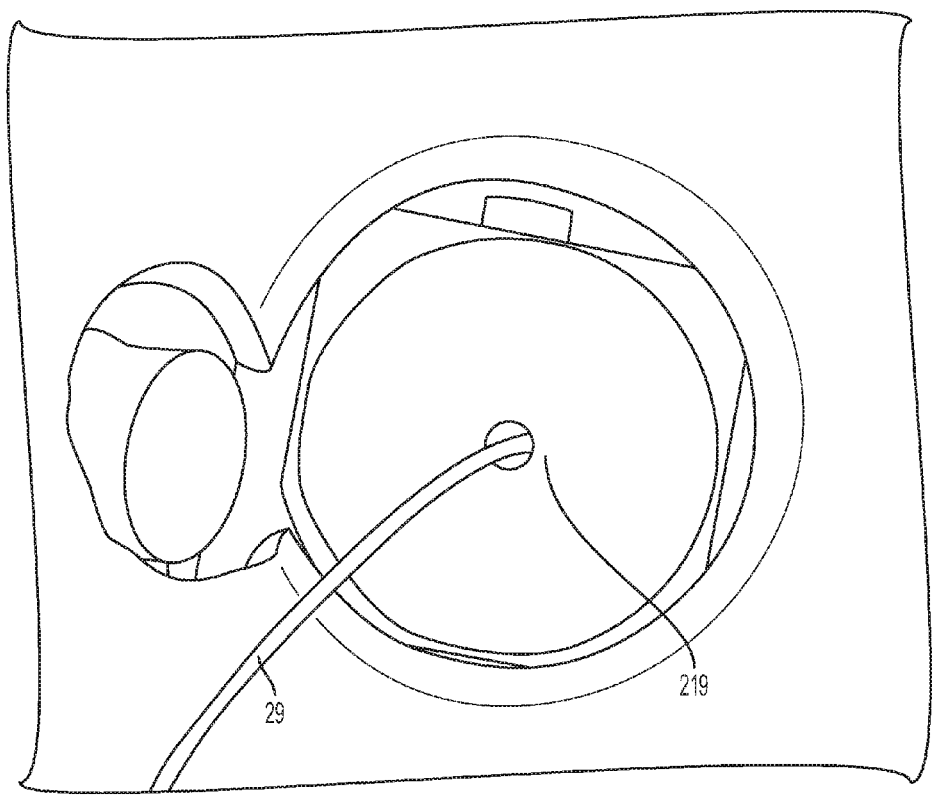
Figure 6C:
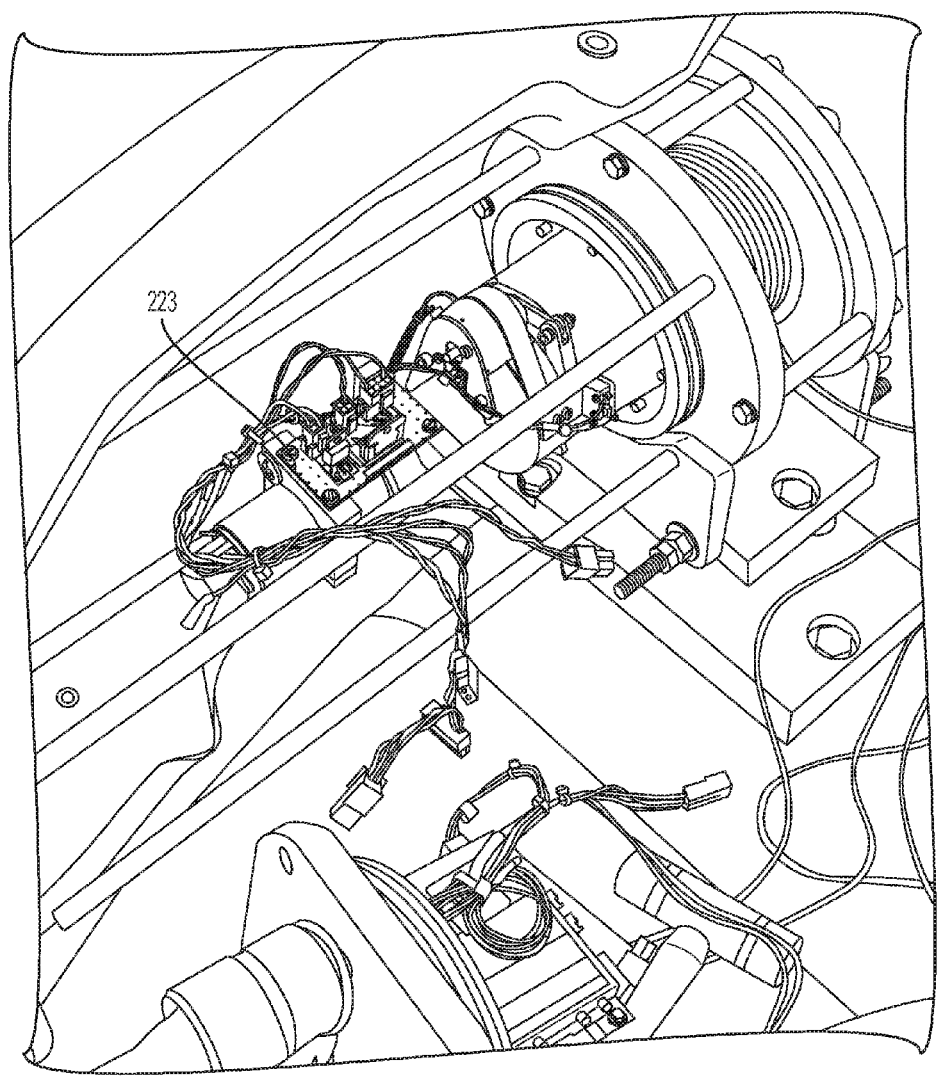
FIGS. 6C-D are photographs of profiler winch computer boards of the present embodiment.
Figure 6D:
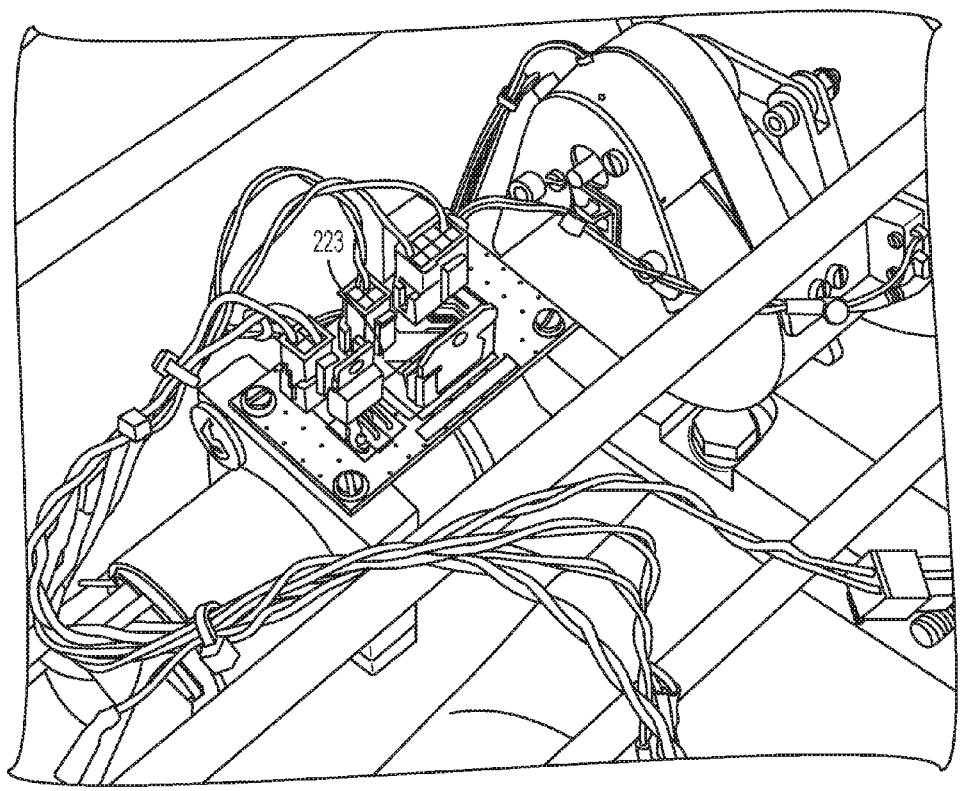

Referring now to FIG. 6A shown is the base unit profiler receiver having base unit cable 29 attaching profiler 17 (FIG. 1) to base unit 21 (FIG. 1). FIG. 6B is a close-up of FIG. 6A, also showing base unit inductive charger 219 and cable 29. FIG. 6C shows profiler winch computer boards 223 in base unit 21 (FIG. 1). Profiler 17 (FIG. 1) is returned to base unit 21 (FIG. 1) by means of profiler winch 11 (FIG. 3) which is controlled by profiler winch computer boards 223. FIG. 6D shows a closeup of profiler winch computer boards 223.

Figure 7:
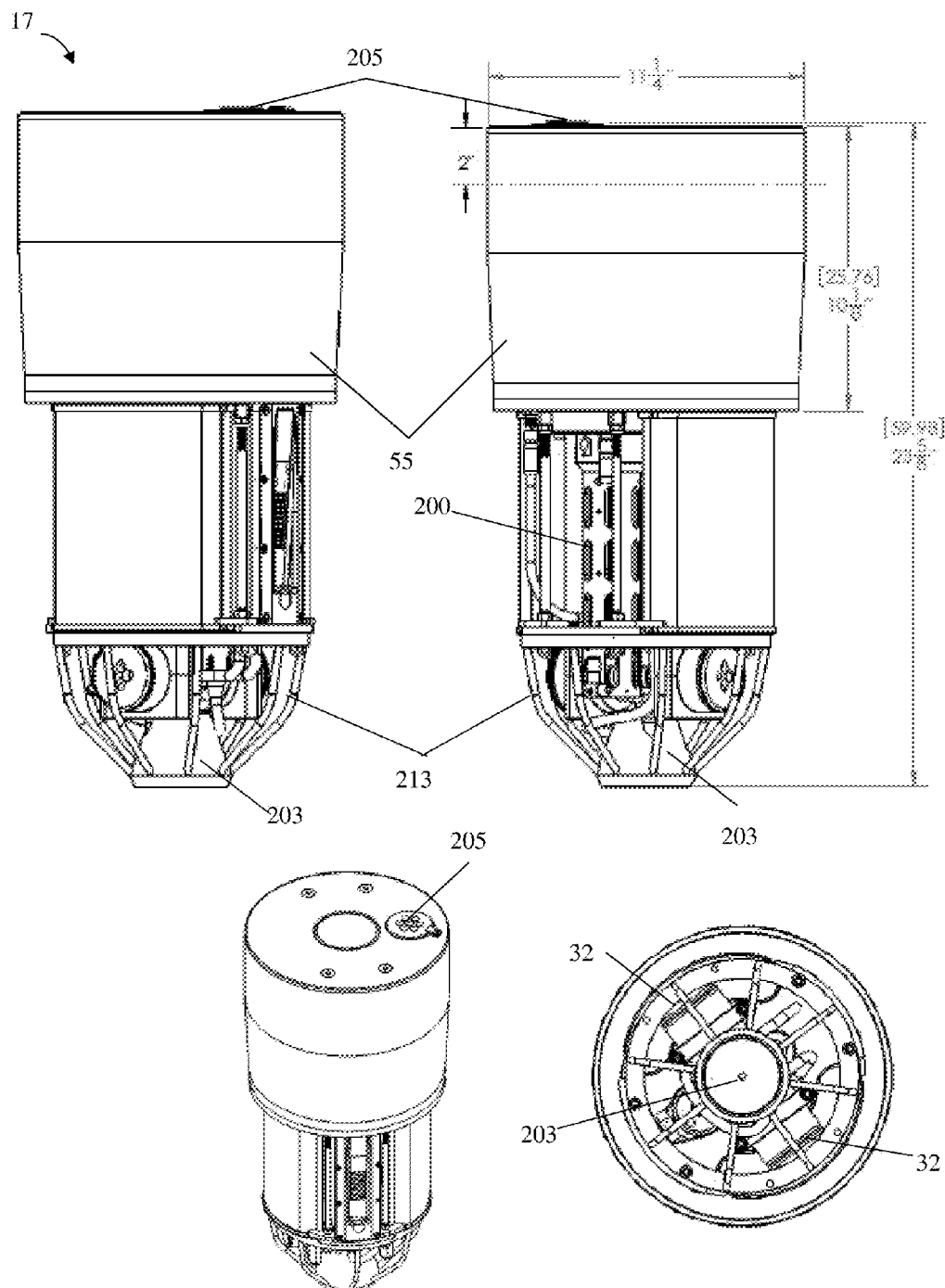
FIG. 7 includes schematic and plan views of the profiler of the present embodiment.

Referring now to FIG. 7, in the exemplary embodiment, profiler 17 measures 59.98 cm in height, and instrument enclosure 55 measures 25.76 cm in height and 28.59 cm across. Also shown are profiler bottom cage 213 for docking profiler 17, CTD sensor 200, irradiance sensor 205, enclosure system 55, and profiler inductive charge 203.

Figure 8:
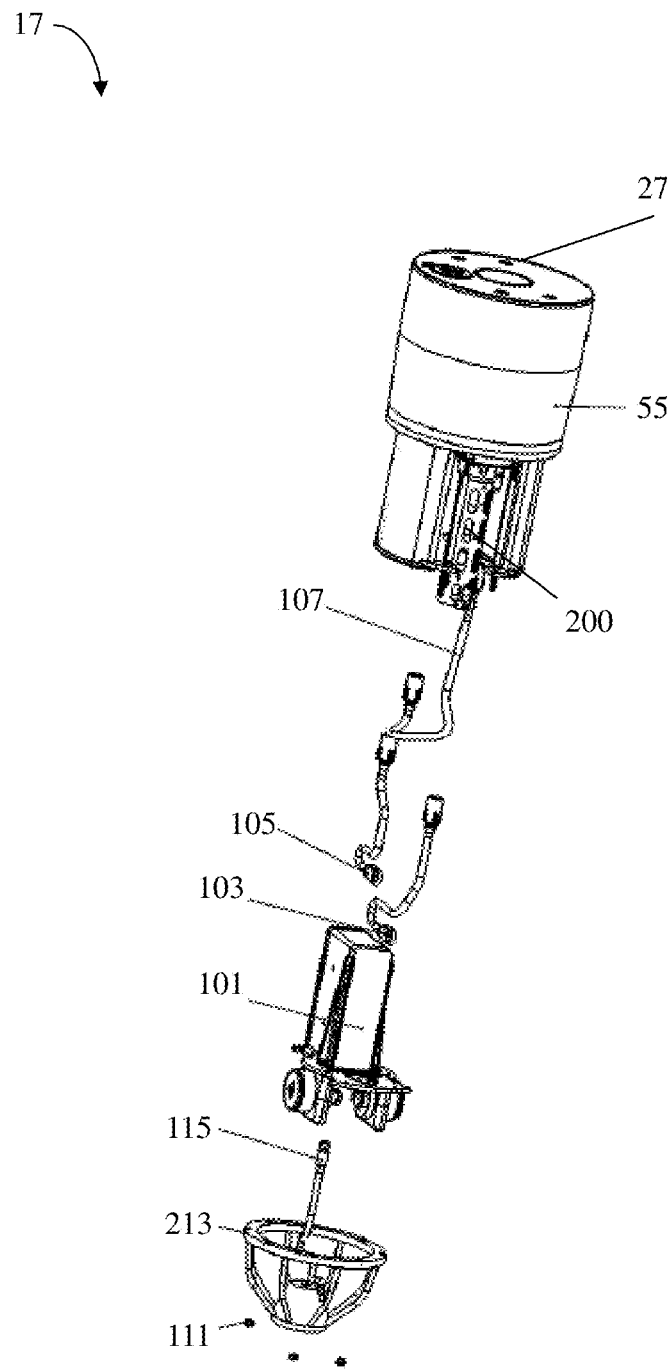
FIG. 8 is a schematic diagram of the parts and interconnection of the profiler of the present embodiment.

Referring now to FIG. 8, profiler 17 of the present embodiment can include, but is not limited to including, antenna 27, CTD 200, assembly middle plate 101, middle plate cable 103, connecting cable 105, BAM cable 107, profiler bottom cage 213, self-locking nuts 111, enclosure system 55, charging coil cable 115, and enclosure system 55

Figure 9:
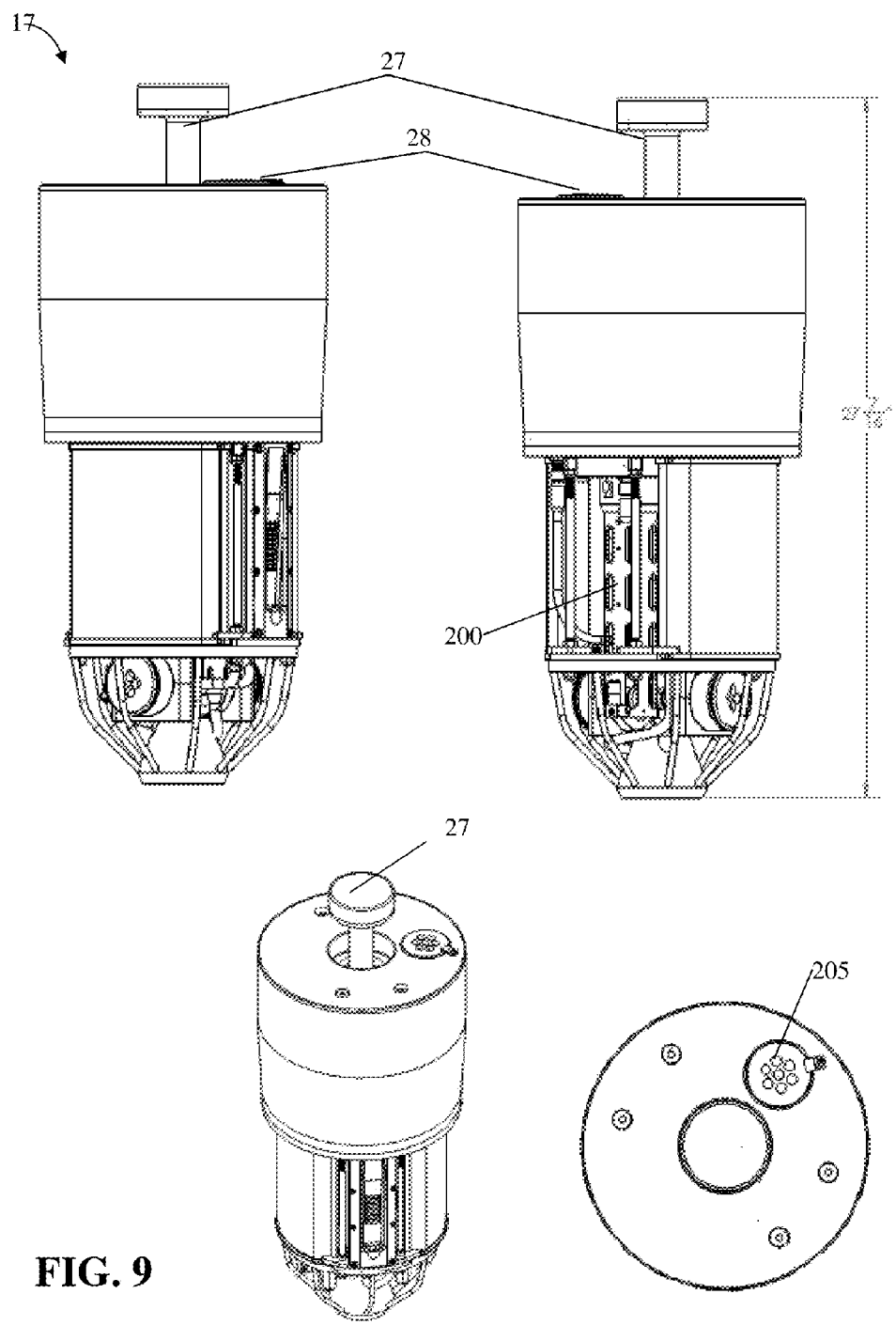
FIG. 9 includes schematic and plan views of the profiler of the present embodiment with the antenna extended.
Figure 10:
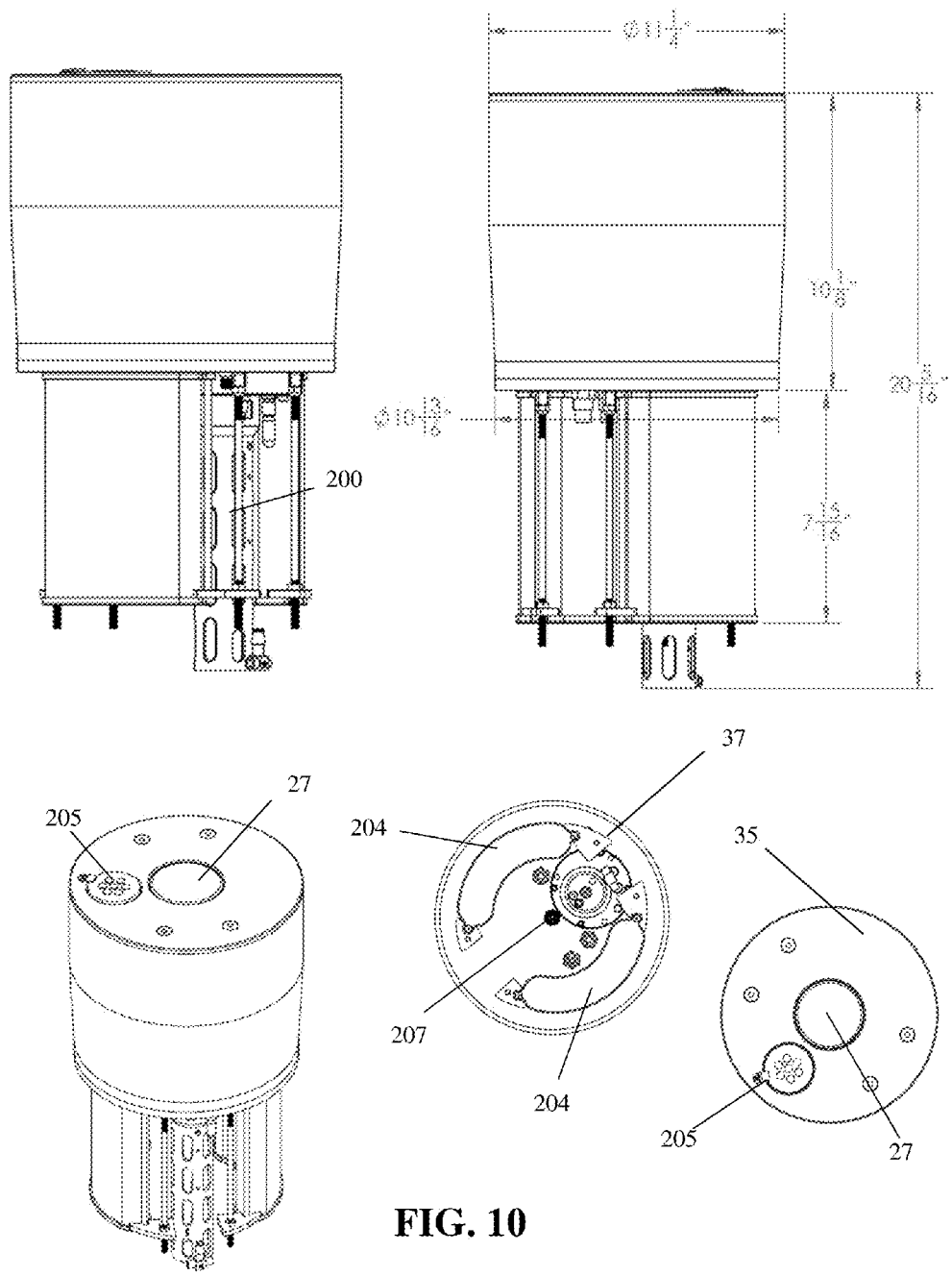
FIG. 10 includes schematic and plan views of the internals of the profiler of the present embodiment.

Referring now to FIG. 9, profiler 17 is shown with pop-up antenna 27 extended a distance of 9.71 cm, for example. Also shown are sensor cap 28, CTD 200, and irradiance sensor 205.

Referring now to FIG. 10, pressure vessel top plate 35 and profiler bottom plate 37 are shown in detail. Also shown are CTD 200, antenna 27, irradiance sensor 205, profiler batteries 204, and wave pressure transducer 207.

Figure 11:
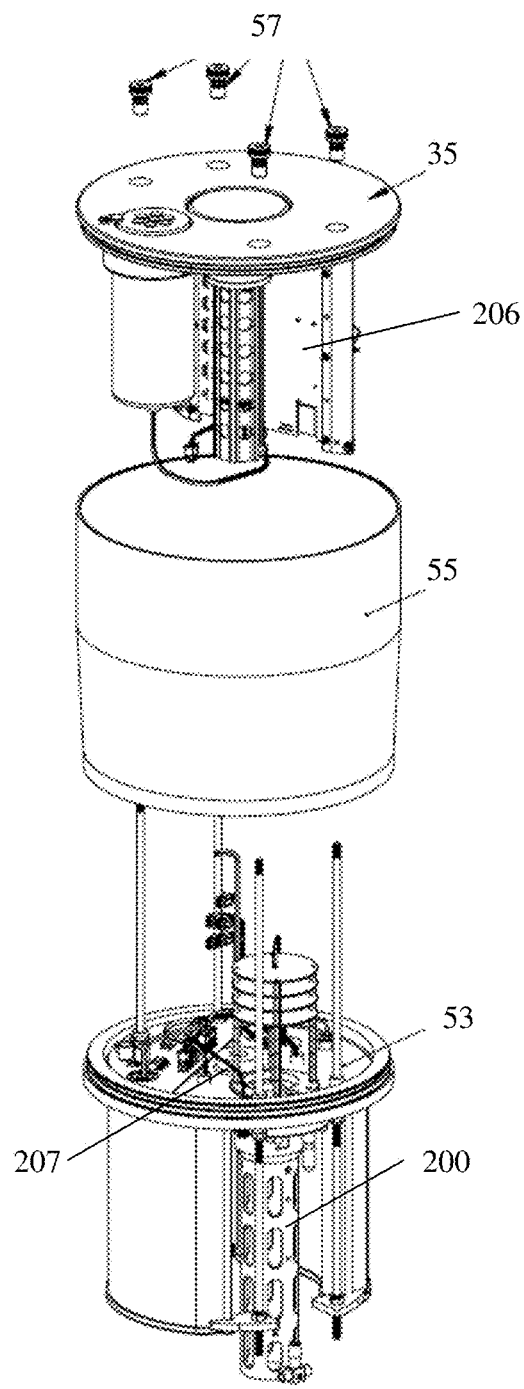
FIG. 11 is a schematic diagram of the major parts of the profiler of the present embodiment.

Referring now to FIG. 11, pressure vessel bottom plate 53, enclosure 55, pressure vessel top plate 35, CTD 200, profiler computer board 206, wave pressure transducer 207, and plug nuts 57 are shown.

Figure 12A:
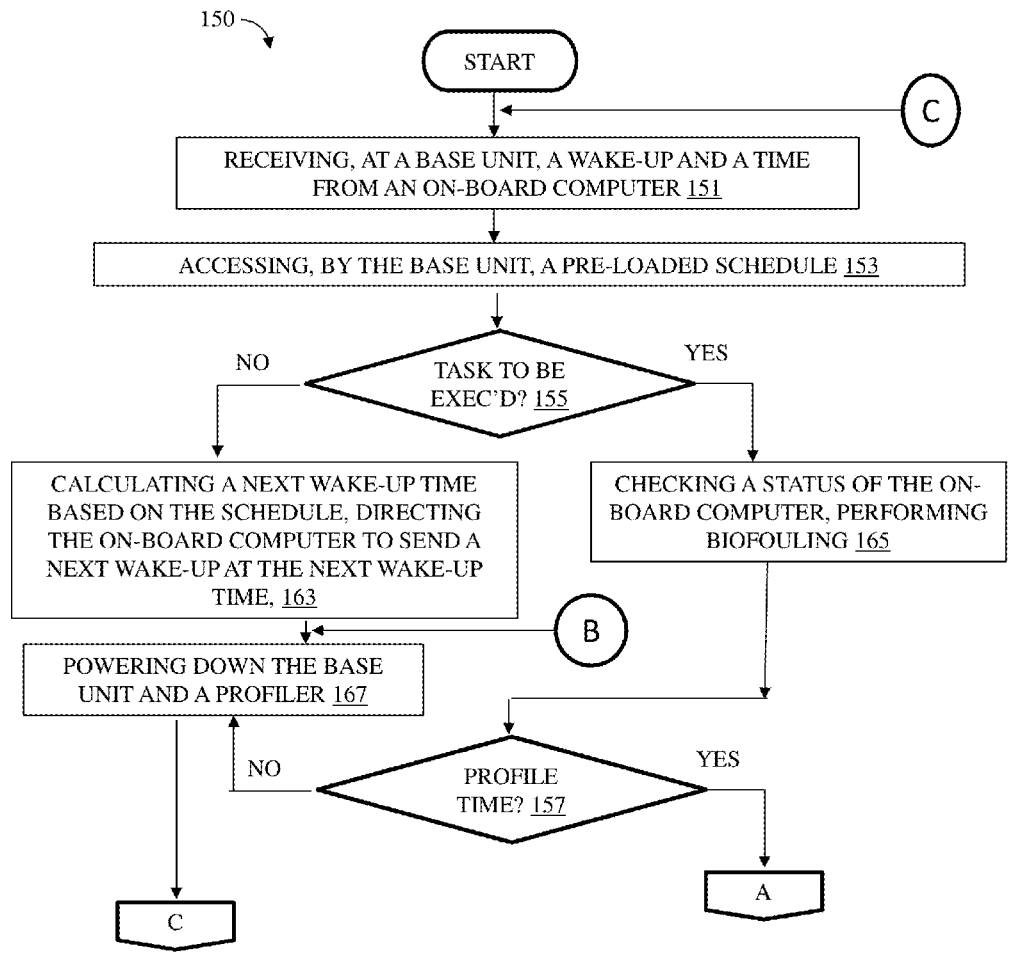
FIGS. 12A-12B are flowcharts of the method of operation of the system of the present embodiment.
Figure 12B:
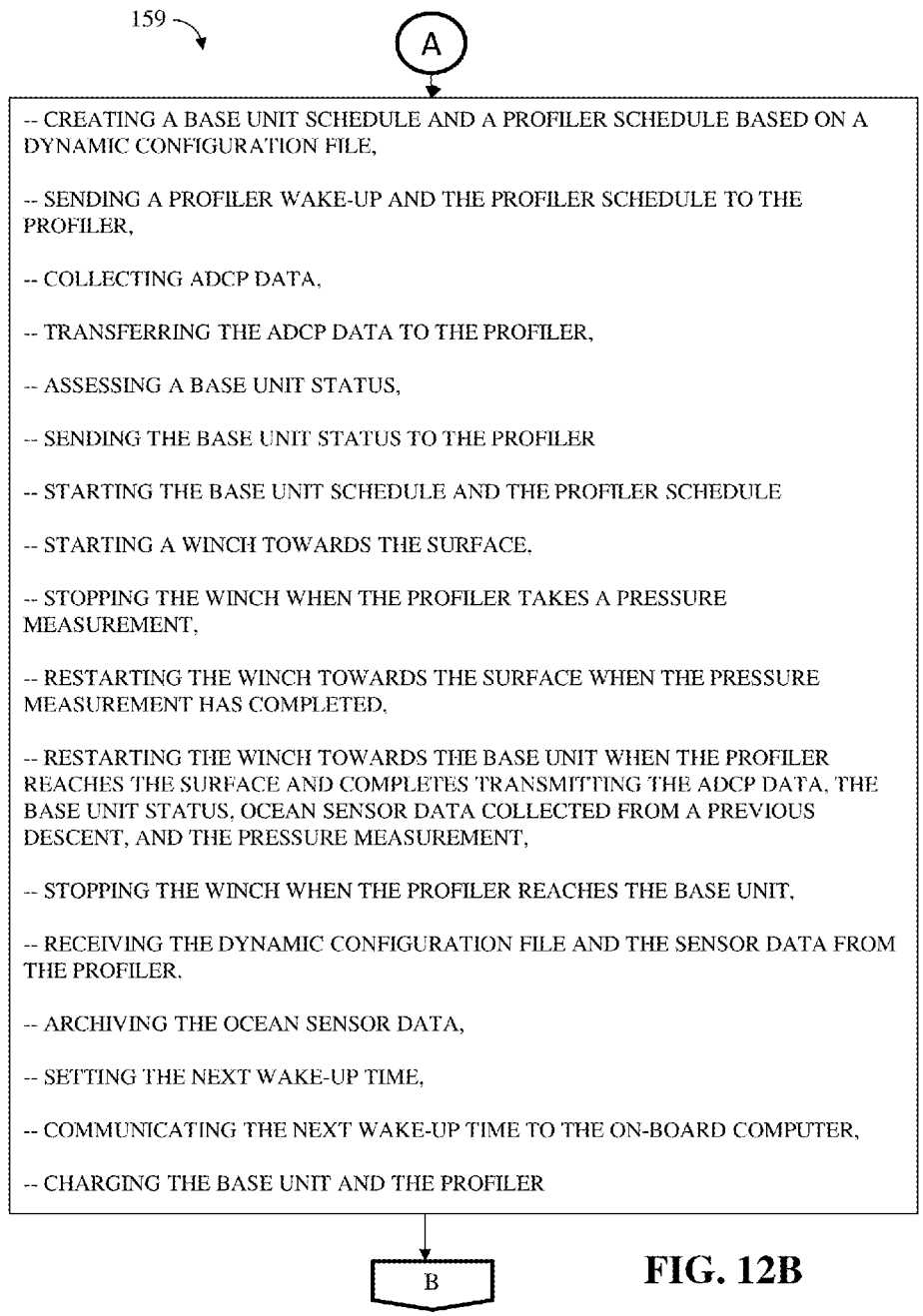

Referring now to FIGS. 12A-B, method 150 for collecting ocean sensor data can include, but is not limited to including, the steps of receiving 151, at a base unit, a wake-up and a time from an on-board computer, and accessing 153, by the base unit, a pre-loaded schedule. If 155, according to the pre-loaded schedule, a task is not to be executed by the base unit, calculating 163 a next wake-up time based on the schedule, directing the on-board computer to send a next wake-up at the next wake-up time, and powering down the base unit and a profiler. If 155, according to the pre-loaded schedule, a task is to be executed by the base unit, checking 165 a status of the on-board computer, and performing biofouling remediation. Biofouling remediation is controlled by the on-board computer. It is an independent function which happens on a periodic cycle. If 157, according to the pre-loaded schedule, it is not time to do a profile, powering 167 down the base unit and the profiler. If, according to the pre-loaded schedule, it is time to do a profile, creating 159 a base unit schedule and a profiler schedule based on a dynamic configuration file, sending a profiler wake-up and the profiler schedule to the profiler, collecting ADCP data, transferring the ADCP data to the profiler, assessing a base unit status, sending the base unit status to the profiler, starting the base unit schedule and the profiler schedule, starting a winch towards the surface, stopping the winch when the profiler takes a pressure measurement, restarting the winch towards the surface when the pressure measurement has completed, restarting the winch towards the base unit when the profiler reaches the surface and completes transmitting the ADCP data, the base unit status, ocean sensor data collected from a previous descent, and the pressure measurement, stopping the winch when the profiler reaches the base unit, receiving the dynamic configuration file and the sensor data from the profiler, archiving the ocean sensor data, setting the next wake-up time, communicating the next wake-up time to the on-board computer, charging the base unit and the profiler, and powering down the base unit and the profiler.

Power is required in the base unit to operate the bottom controller computer, the winch and optionally in the ADCP; power is required in the profiling unit to operate the antenna, CTD, pressure sensor (waves) and optical instruments. Batteries in the base unit can charge batteries in the profiling unit through, for example, but not limited to, an inductive coupling. Optionally, the system of the present embodiment can perform periodic diagnostic checks to ensure that the profiler is functioning correctly, and to help detect and track problems.

Figure 13:
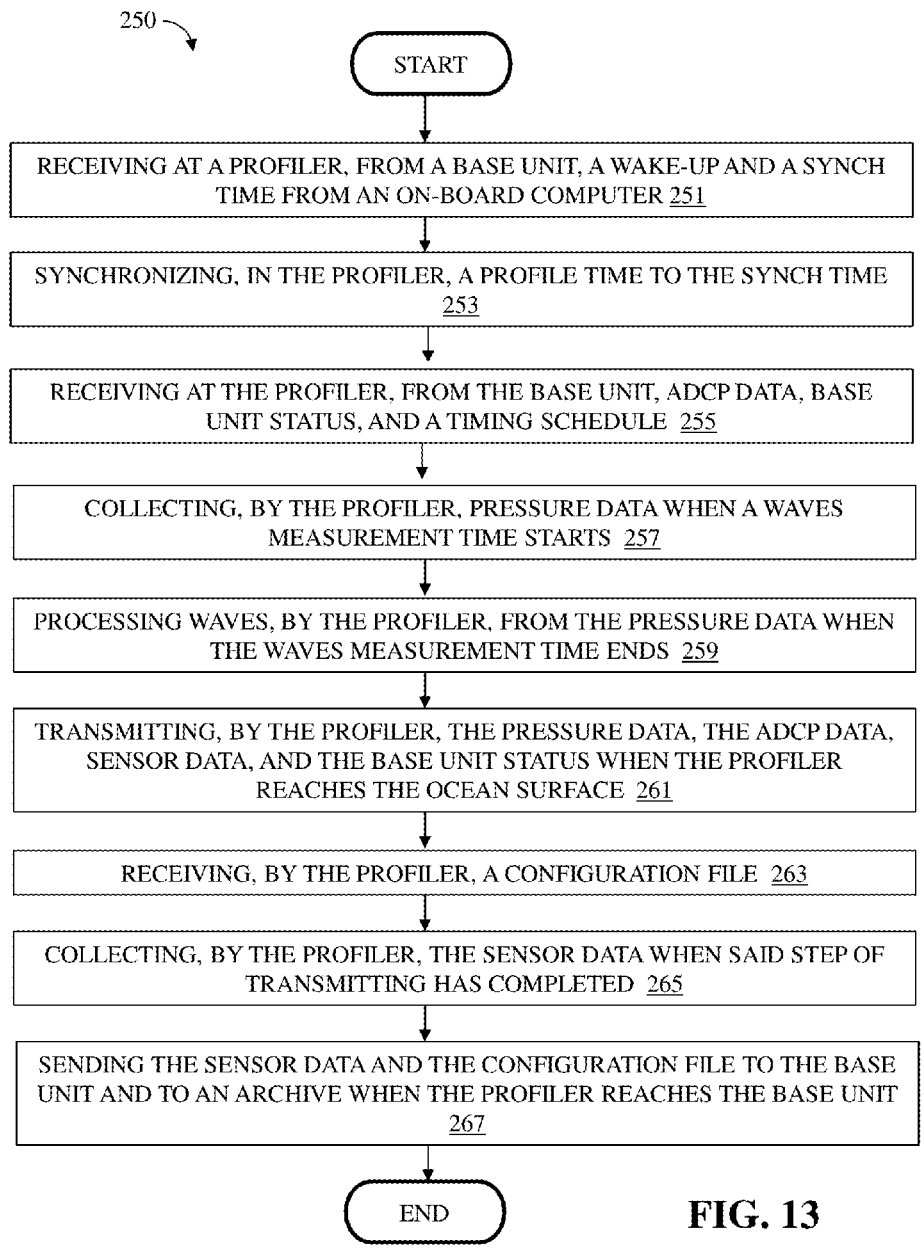
FIG. 13 is a flowchart of the method of operation of the profiler of the present embodiment.

Referring now primarily to FIG. 13, method 250 for collecting ocean sensor data can include, but is not limited to including, receiving 251 at a profiler, from a base unit, a wake-up and a synch time; synchronizing 253, in the profiler, a profile time to the synch time, receiving 255 at the profiler, from the base unit, ADCP data, bottom status, and a timing schedule, collecting 257, by the profiler, pressure data when a waves measurement time starts, processing 259 waves, by the profiler, from the pressure data when the waves measurement time ends, transmitting 261, by the profiler, the pressure data, the ADCP data, sensor data, and the base unit status when the profiler reaches the ocean surface, receiving 263, by the profiler, a configuration file, collecting 265, by the profiler, the sensor data when said step of transmitting has completed, and sending 267 the sensor data and the configuration file to the base unit and to an archive when the profiler reaches the base unit.

Figure 14A:
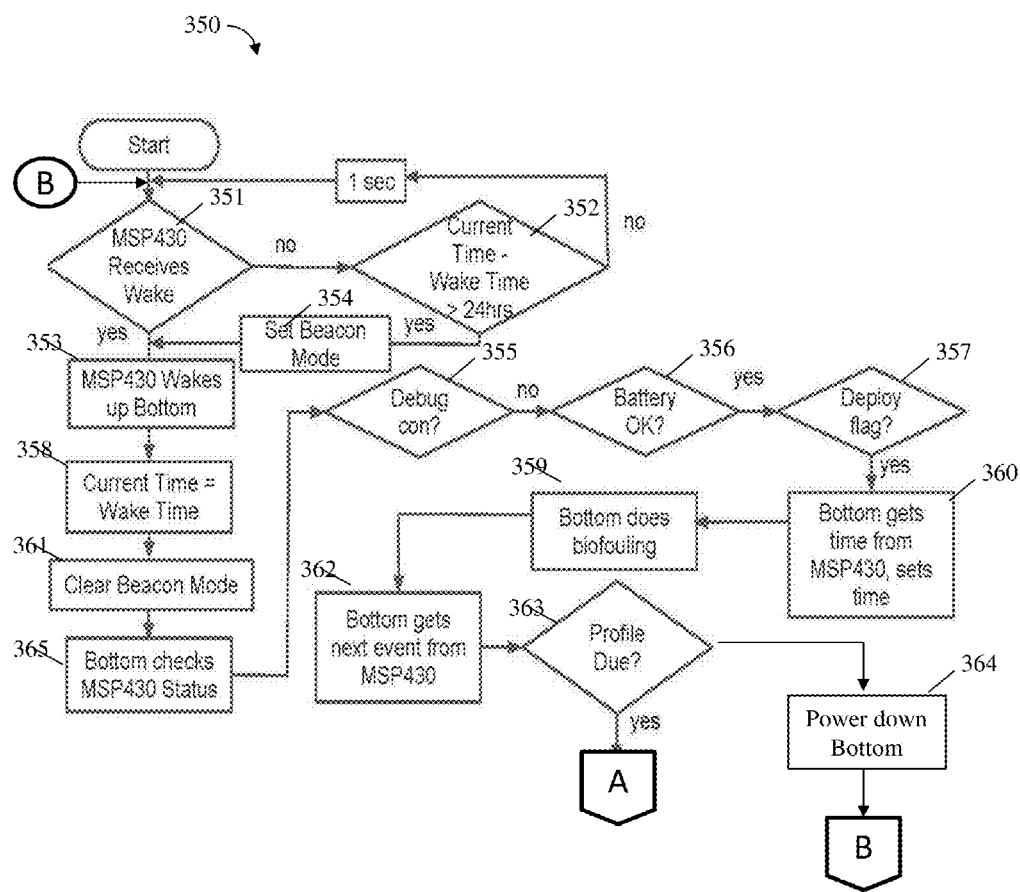
FIGS. 14A-D are flowcharts of the details of the method of FIG. 13.

Referring now to FIG. 14A, detailed method 350 of the present embodiment for collecting ocean data can include, but is not limited to including, the steps of if 351 a wake-up is not received into an on-board computer, for example, but not limited to a Texas instruments MSP430 microcontroller platform, and if 352 the difference between the current time and the wake time is less than or equal to 24 hours, then the loop returns to step 351. The on-board computer implements a real-time clock/alarm/wake function. The on-board computer wakes the base unit and sets the date/time. After completion of setting date/time the base unit looks at a pre-loaded schedule, pre-loaded, for example, before deployment, and determines whether it is time to execute a task. If no task is to be executed, the base unit calculates the next wake time based on the schedule sets the on-board computer to wake the base unit at that time. Then the base unit powers itself down. If the difference is greater than 24 hours, beacon mode is enabled 354. Beacon mode is an independent function of the profiler. If the profiler is cut loose from the base unit for some reason, the profiler will start to beacon via its transmitter which enables tracking of the profiler. The beacon mode is reset 361 every time there is communication between the base unit and the profiler, and that happens when the profiler is docked. If the profiler has not communicated with the base unit within a 24-hour period the profiler will enter beacon mode. If 351 a wake-up is received, the on-board computer wakes up 353 a base unit (referred to herein interchangeably as either "base unit" or "bottom"), the base unit sets 358 the current time to the wake time, disables 361 beacon mode, and checks 365 the status of the on-board computer. If 355 there is not a communications problem and if 356 the battery is ok, and if 357 the base unit is deployed, the on-board computer provides 360 time to the base unit and the base unit sets its clock, the base unit performs 359 biofouling, and the on-board computer provides 362 the next event to the base unit. If 363 the next event is not launching the profiler, the base unit powers itself down 364, and the loop continues with step 351.

Figure 14B:
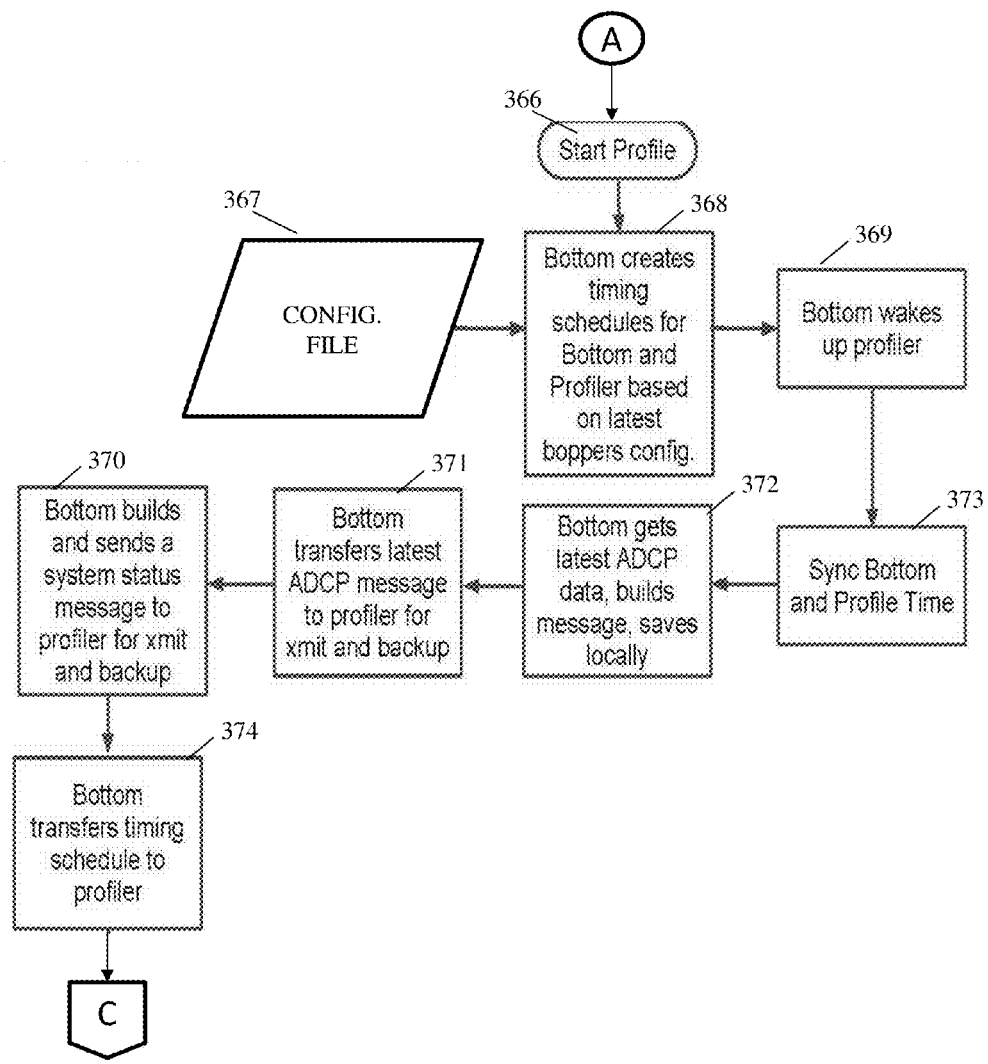

Referring now primarily to FIG. 14B, If 363 (FIG. 14A) the next event is launching a profiler to start 366 a profile, the base unit creates 368 timing schedules for the base unit and the profiler based on the latest configuration file 367. An initial configuration file is provided when the base unit is deployed, and the profiler can receive an updated configuration file when it surfaces and download the changes to the base unit when it returns to the base unit. The base unit wakes up 369 the profiler, and synchronizes 373 the time between the profiler and the base unit. The base unit collects and saves 372 ADCP data, transfers 371 the collected ADCP data to the profiler, sends 370 base unit status (previously collected in step 365 et seq.) to the profiler, and sends 374 the profiler schedule to the profiler.

Figure 14C:
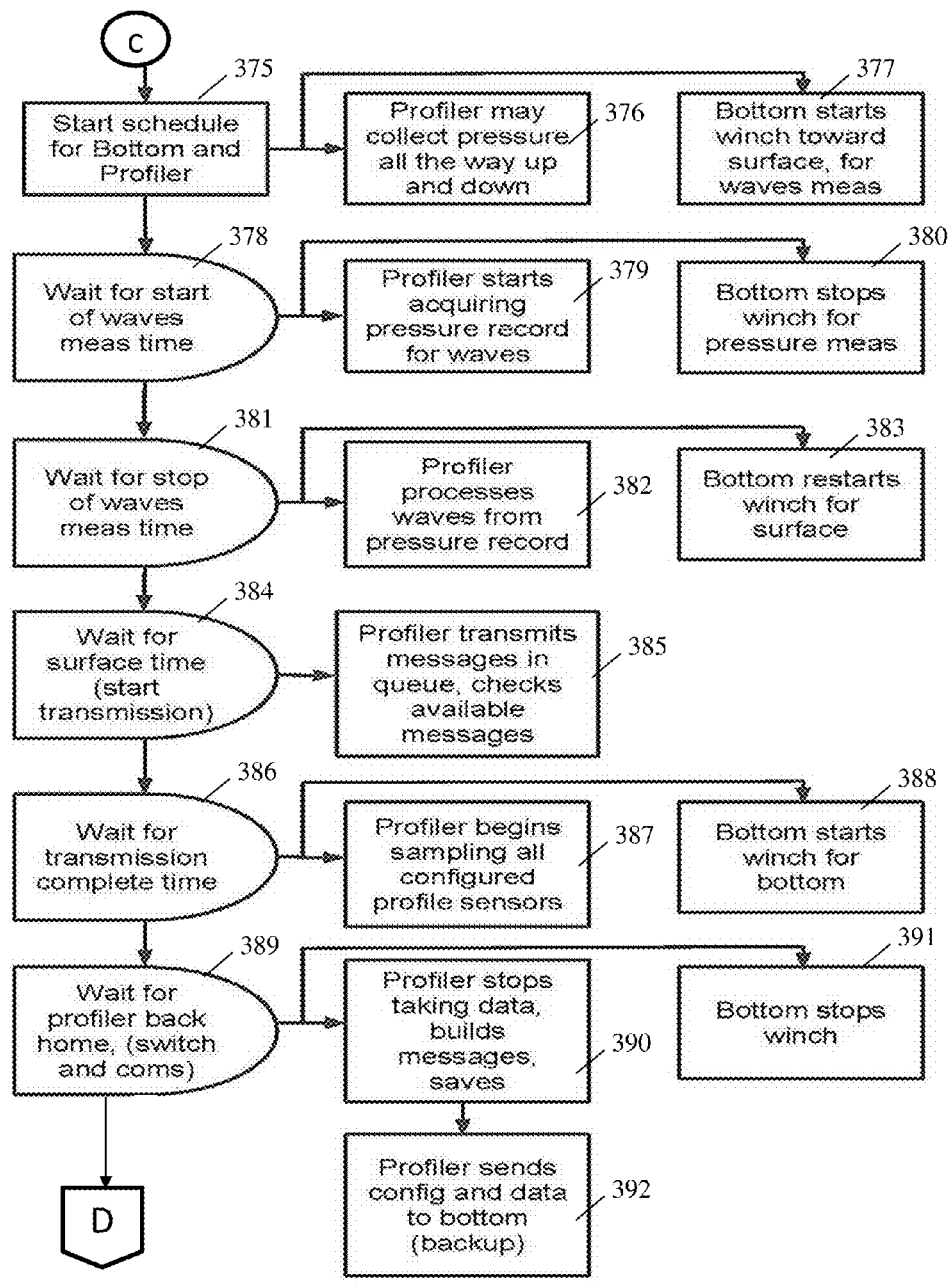

Referring now to FIG. 14C, the base unit and the profiler begin executing 375 their schedules. The base unit starts 377 the winch that allows the profiler to proceed towards the surface. The profiler can collect 376 pressure data as it ascends and descends. When 378 the profiler starts 379 acquiring pressure data, the base unit stops 380 the winch so that the pressure can be measured when the profiler is not moving. When 381 the profiler stops taking the pressure measurement, the base unit restarts 383 the winch, and the profiler computes 382 wave data based on the pressure measurements. When 384 the profiler reaches the surface, the profiler transmits 385 the information that it had previously received from the base unit, and the data collected during the profiler's previous ascent(s) and descent(s). The profiler also receives any communications such as, for example, an updated configuration file. The transmission technology can be, for example, iridium. The profiler can extend a pop-up antenna to improve data transmission reliability. When 386 data transmission and reception are complete, the base unit enables 388 the winch to pull the profiler back towards the base unit. The profiler collects 387 data from its configured sensors during the descent. When 389 the profiler docks at the base unit, the base unit stops 391 the winch, and the profiler stops 390 taking data and sends 392 any information it received at the surface and the data it collected to the base unit where the data are archived.

Figure 14D:
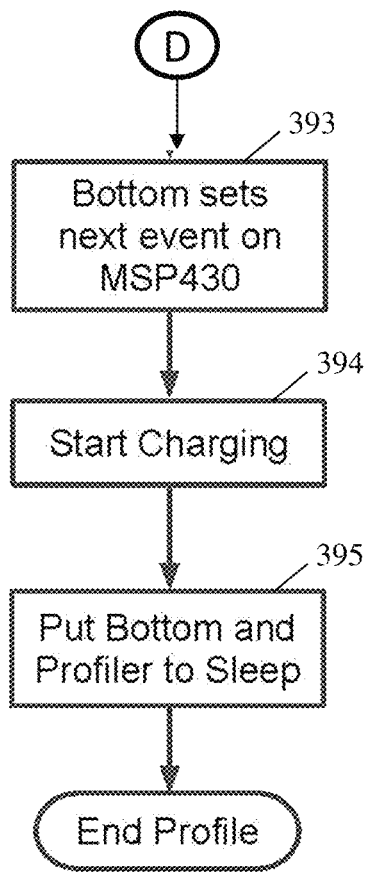

Referring now to FIG. 14D, the base unit informs 393 the on-board computer of the next event, the profiler and base unit begin 394 charging, and the bottom puts 395 itself and the profiler to sleep.

Figure 15A:
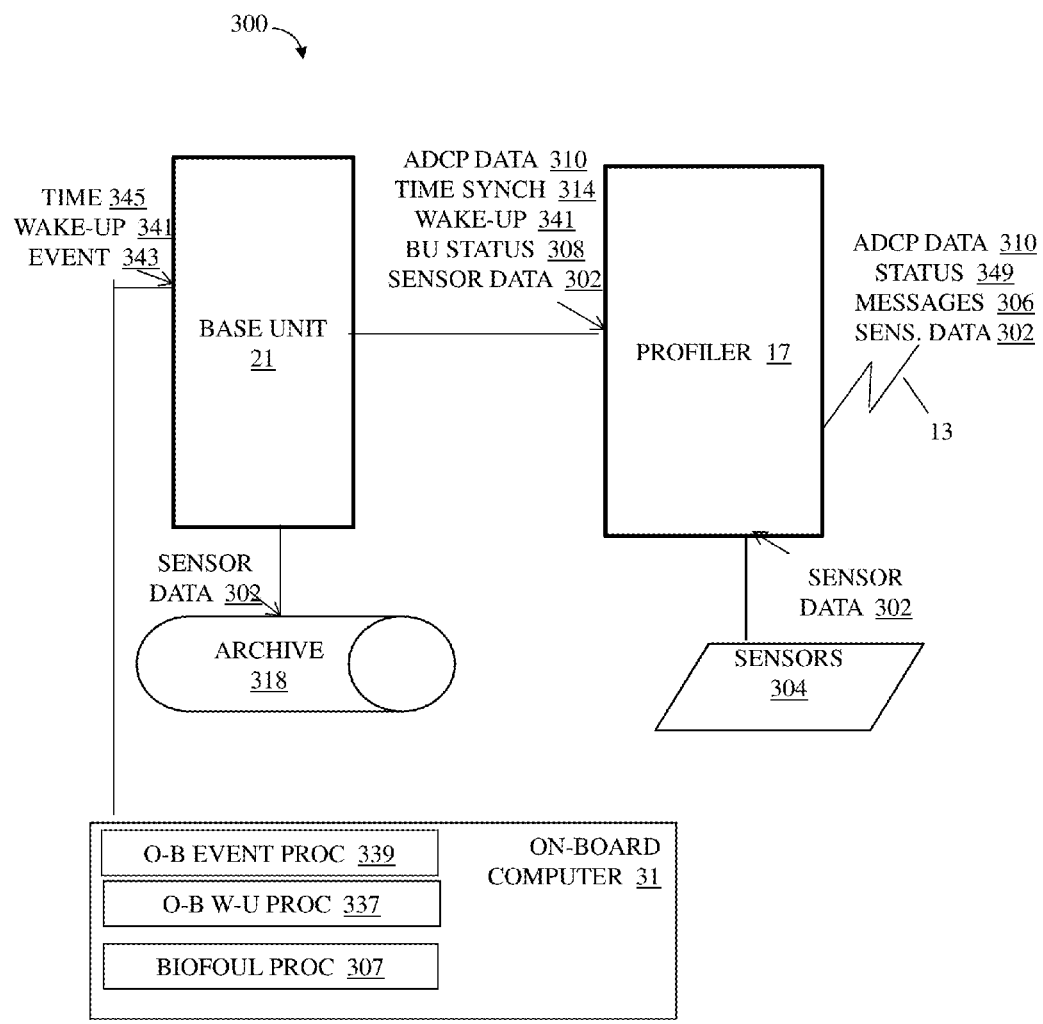
FIG. 15A is a schematic block diagram of the system logic of the present embodiment.

Referring now to FIG. 15A, system 300 for collecting ocean data can include, but is not limited to including base unit 21, profiler 17, on-board computer 31, sensors 304, and archive 318.

Figure 15B:
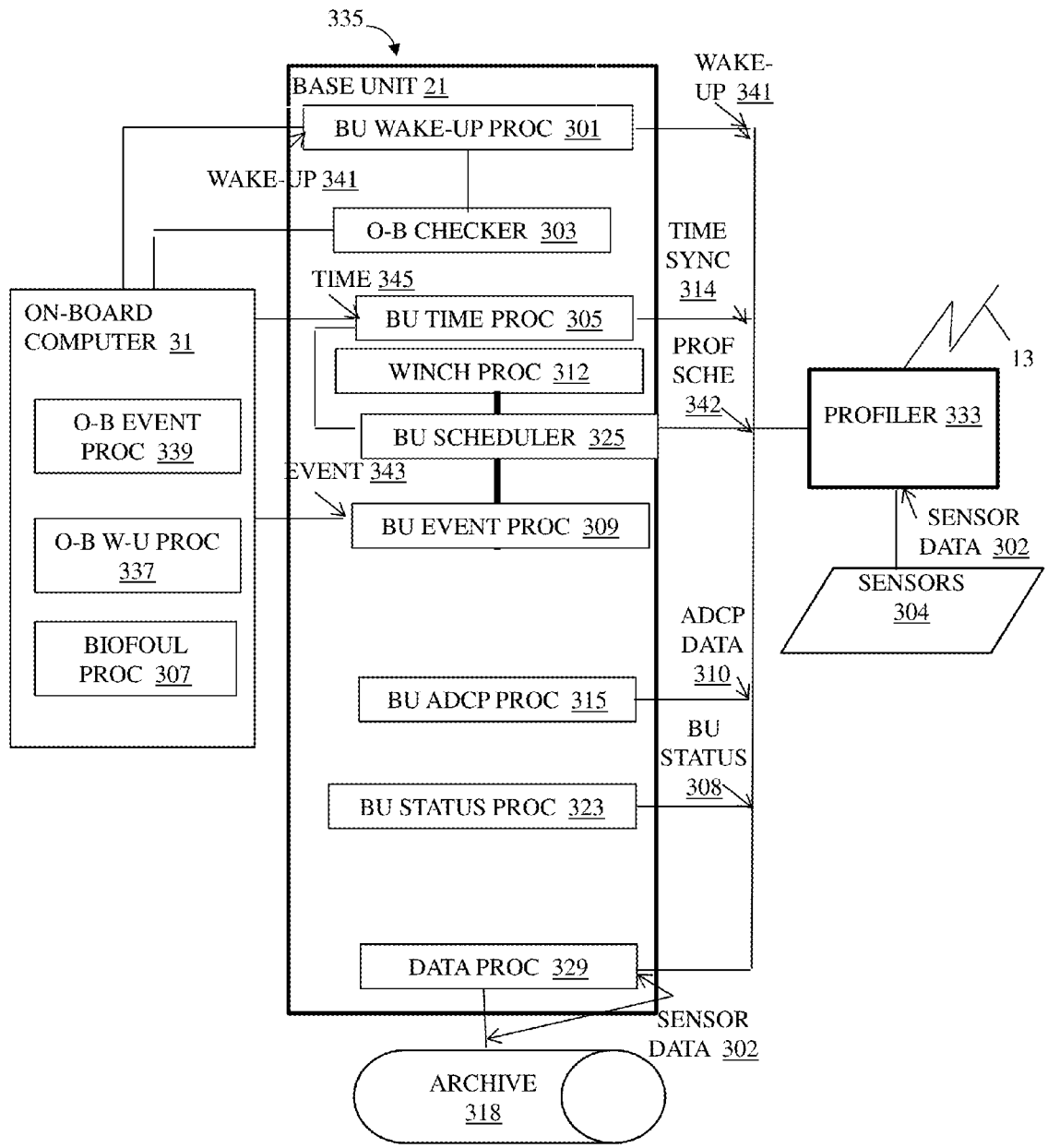
FIG. 15B is a schematic block diagram of the base unit logic of the present embodiment.

Referring now to FIG. 15B, base unit 21 can include but is not limited to including, base unit wake-up processor 301 receiving, at base unit 21, a wake-up from on-board computer wake-up processor 337, and a base unit time processor 309 receiving, at base unit 21, event 343 and time 345 from on-board computer event processor 339. Base unit 21 can also include base unit scheduler 325 which accesses a pre-loaded schedule. If, according to the pre-loaded schedule, a task is not to be executed by base unit 21, base unit time wake-up processor 301 calculates a next wake-up time based on the schedule, and directs on-board computer wake-up processor 337 to send a next wake-up at the next wake-up time based on the schedule. Base unit wake-up processor 301 powers down base unit 21 and profiler 17. If, according to the pre-loaded schedule, a task is to be executed by base unit 21, on-board checker 303 checks a status of on-board computer 31, and biofoul processor 307 performs biofoul remediation. If, according to the pre-loaded schedule, it is not time to initiate a profile, base unit 21 powers down base unit 21 and profiler 17. If, according to the pre-loaded schedule, it is time to initiate a profile, base unit scheduler 325 creates a base unit schedule and profiler schedule 342 based on a pre-loaded and dynamic configuration file, base unit wake-up processor 301 sends wake-up 341 to profiler 17, and base unit scheduler 325 sends profiler schedule 342 to profiler 17. Base unit ADCP processor 315 collects ADCP data 310, and transfers ADCP data 310 to profiler 17. Base unit status processor 323 assesses base unit status 308, and sends base unit status 308 to profiler 17. Base unit scheduler 325 starts the base unit schedule and the profiler schedule, and winch processor 312 starting a winch, housing the connection between base unit 21 and profiler 17, towards the surface. Winch processor 312 stops the winch when profiler 17 takes a pressure measurement, restarts the winch towards the surface when the pressure measurement has completed, restarts the winch towards base unit 21 when profiler 17 reaches the surface and completes transmitting ADCP data 310, base unit status 308, ocean sensor data 302 collected from a previous descent, and the pressure measurement data, and stops the winch when profiler 17 reaches base unit 21. Data processor 329 receives the dynamic configuration file and sensor data 304 from profiler 17, and archives ocean sensor data 304 in archive 318. Base unit wake-up processor 301 sets the next wake-up time 341, and communicates the next wake-up time 341 to on-board computer wake-up processor 337. Base unit 21 and profiler 33 are charged, and base unit 21 powers down base unit 21 and profiler 17.

Figure 15C:
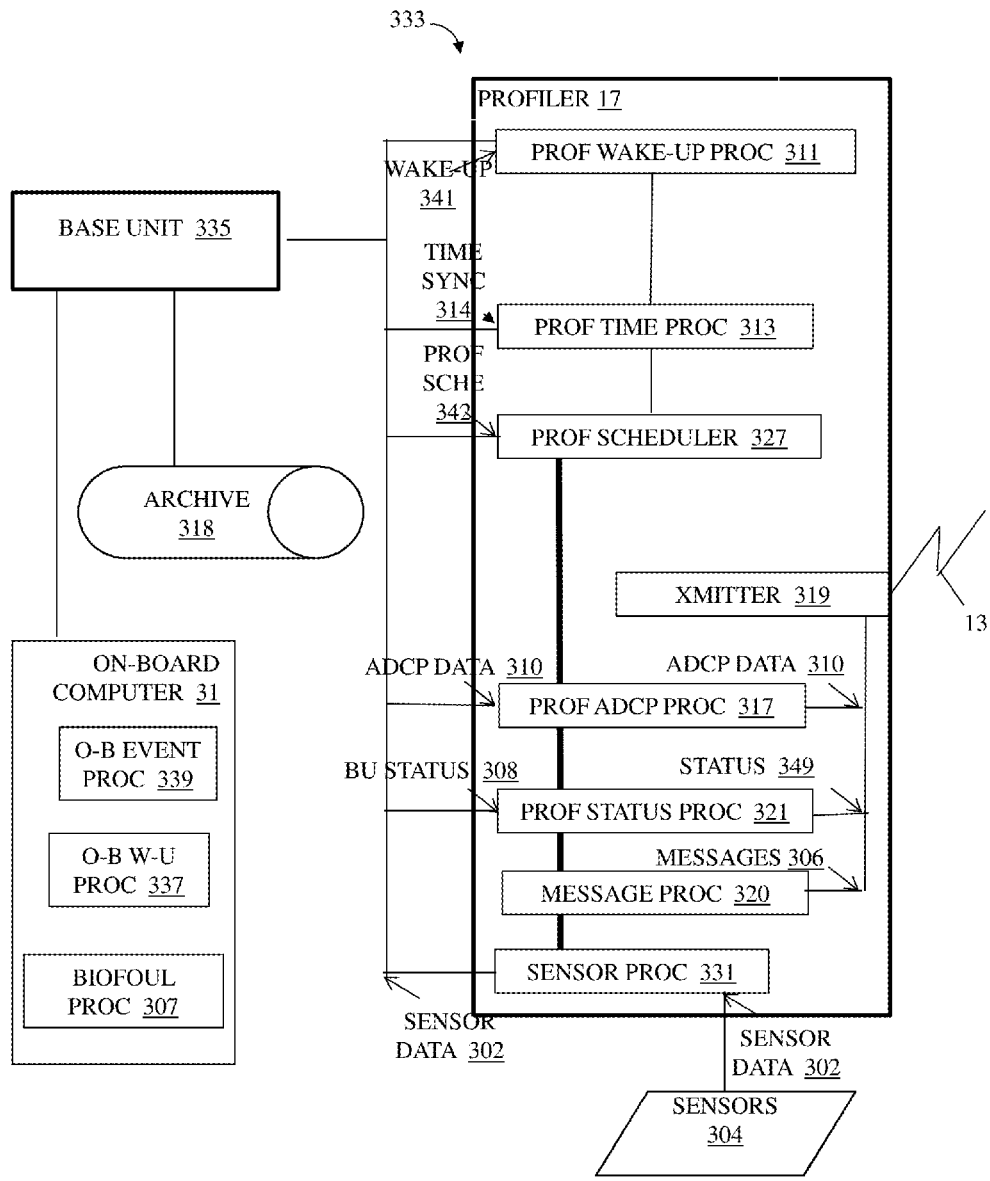
FIG. 15C is a schematic block diagram of the profiler logic of the present embodiment.

Referring now to FIG. 15C, profiler 17 can include, but is not limited to including, profiler wake-up processor 311 receiving at profiler 17, from base unit 21, wake-up 341, and profiler time processor 313 receiving at profiler 17, from base unit 21, synch time 314. Profiler time processor 313 synchronizes, in profiler 17, a profile time to synch time 314. Profiler ADCP processor 317 receives, at profiler 17, from base unit 21, ADCP data 310, profiler status processor 321 receives at profiler 17 from base unit 21 base unit status 308, message processor 320 receives at profiler 17 from base unit 21 messages 306, and profiler scheduler 327 receives at profiler 17 from base unit 21 profiler schedule 342. Profiler status processor 321 sends status 349, which is a combination of base unit status 308 and a profiler status, to transmitter 319 to be sent to a receiving station by communications device 13. Sensor processor 331 collects, into profiler 17, pressure data when a waves measurement time starts, and processes waves from the pressure data when the waves measurement time ends. Transmitter 319 transmits via communications medium 13 the pressure data, ADCP data 310, sensor data 302, messages 306, and base unit status 308 when profiler 17 reaches the ocean surface, and can receive a configuration file. The initial configuration file can be downloaded before deployment of the system. Changes to the configuration file can be made when an updated configuration file is received by profiler 17 during communications at the surface through communications medium 13. The profiler (while on the surface) may download the changes and upon its return to the bottom upload them to the controller.

Sensor processor can collect sensor data 302 when said step of transmitting has completed, i.e. when profiler 17 is descending towards base unit 21, and sends sensor data 302 and the configuration file to base unit 21, and base unit 21 sends sensor data 302 to archive 318 when profiler 17 reaches base unit 21.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIGS. 12A-B, FIG. 13, and FIGS. 14A-D, methods 150, 250 and 350 can be, in whole or in part, implemented electronically. Signals representing actions taken by elements of system 100 (FIG. 1) and system 300 (FIGS. 15A-C) and other disclosed embodiments can travel over at least one live communications network 13 (FIGS. 1, and 15A-C). Control and data information can be electronically executed and stored on at least one computer-readable medium. The system can be implemented to execute on at least one computer node in at least one live communications network 13 (FIG. 1 and FIGS. 15A-C). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A bottom mooring for enabling ocean measurement data comprising:
    a base unit having a low profile cross-section, a low center of gravity, and a smooth upper surface with no edges or protruding structures;
    a profiler including a plurality of optical sensors, an antenna and communications equipment transmitting the ocean measurement data collected by the sensors to a receiving station through the antenna;
    a cable attaching the profiler to the base unit;
    a controller and winch controlling ascent of the profiler from the base unit to a water surface, the controller controlling timing and sampling frequency of the ocean measurement data, and the controller and winch controlling descent of the profiler such that the profiler is stowed completely in the base unit with no portion of the profiler protruding into the water column when the profiler is completely descended;
    an enclosure system surrounding the optical sensors on the profiler protecting the bio-optical sensors from bio-fouling;
    at least one profiler battery mounted in the profiler and powering the antenna, the CTD sensor, and the optical sensors;
    an acoustic Doppler current profiler (ADCP) in electronic communications with the base unit; and
    a base unit battery set mounted in the base unit powering an on-board computer and the winch, the base unit battery set inductively charging the at least one profiler battery.

2. The bottom mooring as in claim 1 wherein the low-profile cross-section has a 2-meter footprint and a 1-meter height.

3. The bottom mooring as in claim 1 wherein the base unit weighs between about 600 kilograms and about 900 kilograms.

4. The bottom mooring as in claim 1 wherein the profiler comprises a conductivity-temperature-depth (CTD) sensor, a fluorescence triplet sensor measuring chlorophyll, phycoerythrin, and colored dissolved organic matter fluorescence, a backscattering sensor, a scattering meter, a downwelling irradiance sensor, and a pressure sensor measuring wave spectra.

5. The bottom mooring as in claim 1 wherein the profiler comprises a pop-up antenna.

6. The bottom mooring as in claim 1 wherein the profiler transmits the ocean measurement data through an iridium system.

7. The bottom mooring as in claim 1 wherein the profiler comprises aluminum.

8. The bottom mooring as in claim 1 wherein the base unit comprises fiberglass.

9. The bottom mooring as in claim 1 wherein the battery unit base set powers the ADCP.

10. The bottom mooring as in claim 1 wherein the ADCP is self-powered.

11. A method for collecting ocean sensor data comprising the steps of:
    receiving at a profiler, from a base unit, a wake-up and a synch time;
    synchronizing, in the profiler, a profile time to the synch time;
    receiving at the profiler, from the base unit, ADCP data, base unit status, and a timing schedule;
    collecting, by the profiler, pressure data when a waves measurement time starts;
    processing waves, by the profiler, from the pressure data when the waves measurement time ends;
    transmitting, by the profiler, the pressure data, the ADCP data, sensor data, and the base unit status when the profiler reaches the ocean surface;
    receiving, by the profiler, a configuration file;
    collecting, by the profiler, the sensor data when said step of transmitting has completed;
    sending the sensor data and the configuration file to the base unit and to an archive when the profiler reaches the base unit; and
    controlling descent of the profiler by a winch until the profiler is stowed in the base unit with no portion of the profiler protruding into the water column when the profiler is completely descended.

12. A method for manufacturing an ocean data collector comprising the steps of:

contouring an enclosure to have a low profile cross-section, a low center of gravity, and a smooth upper surface with no edges or protruding structures;

manufacturing a profiler, a battery, a base unit, an ADCP, ocean data sensors, communications equipment, and an on-board computer according to size and shape constraints imposed by the contoured enclosure and the available space in the contoured enclosure;

installing the ocean data sensors and the communications equipment in the profiler;

tethering the profiler to a winch of the base unit, the winch stowing the profiler in the base unit with no portion of the profiler protruding into the water column when the profiler is completely descended; and installing the profiler, the battery, the base unit, the ADCP, and the on-board computer in the enclosure, the profiler and the base unit being proximate to the battery.

13. The method as in claim 12 wherein the ocean data sensors comprise an irradiance sensor, a beam attenuation meter, a plurality of optics pucks.

14. The method as in claim 12 wherein the communications equipment comprises iridium technology.

* * * * *